US012010687B2

(12) United States Patent
Elshafie et al.

(10) Patent No.: US 12,010,687 B2
(45) Date of Patent: Jun. 11, 2024

(54) TECHNIQUES FOR ENHANCED SIDELINK FEEDBACK TRANSMISSION

(71) Applicant: QUALCOMM Incorporated, San Diego, CA (US)

(72) Inventors: Ahmed Elshafie, San Diego, CA (US); Wei Yang, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 340 days.

(21) Appl. No.: 17/572,111

(22) Filed: Jan. 10, 2022

(65) Prior Publication Data

US 2023/0224900 A1 Jul. 13, 2023

(51) Int. Cl.
*H04W 72/20* (2023.01)

(52) U.S. Cl.
CPC .................. *H04W 72/20* (2023.01)

(58) Field of Classification Search
CPC ... H04L 5/0094; H04L 5/0053; H04L 5/0037; H04L 5/0007; H04W 4/40; H04W 72/02; H04W 28/26; H04W 72/25; H04W 72/1263
See application file for complete search history.

(56) References Cited

U.S. PATENT DOCUMENTS

| | | | | |
|---|---|---|---|---|
| 2020/0351024 A1* | 11/2020 | Baghel | ................. | H04L 5/0055 |
| 2021/0105728 A1* | 4/2021 | Nguyen | ................. | H04W 52/46 |
| 2021/0167926 A1* | 6/2021 | Lin | ........................ | H04L 1/1858 |
| 2022/0225279 A1* | 7/2022 | Wang | ................... | H04L 1/0026 |
| 2022/0322403 A1* | 10/2022 | Khoshnevisan | ....... | H04W 24/08 |
| 2023/0056249 A1* | 2/2023 | Xue | ....................... | H04L 1/1854 |
| 2023/0224096 A1* | 7/2023 | Gubeskys | ............ | H04L 1/1861 370/329 |
| 2023/0354269 A1* | 11/2023 | Zhang | .................. | H04L 5/0094 |

* cited by examiner

*Primary Examiner* — Mahran Y Abu Roumi
(74) *Attorney, Agent, or Firm* — Holland & Hart LLP

(57) ABSTRACT

Methods, systems, and devices for wireless communications are described. A first wireless device (e.g., a user equipment (UE)) may receive a control message indicating a feedback resource configuration for transmitting feedback information over a sidelink feedback channel that includes two or more symbol periods. The feedback resource configuration may include one or more start and length indicator values (SLIVs), one or more bitmaps, or a combination thereof. The first wireless device may receive a sidelink message from a second wireless device (e.g., a UE) over a sidelink shared channel. The first wireless device may transmit the feedback information to the second wireless device based on decoding the sidelink message from the second wireless device. The first wireless device may transmit the feedback information over the sidelink feedback channel using the two or more symbol periods in accordance with the feedback resource configuration.

30 Claims, 16 Drawing Sheets

TECHNIQUES FOR ENHANCED SIDELINK FEEDBACK TRANSMISSION

TECHNICAL FIELD

The following relates to wireless communications, including techniques for enhanced sidelink feedback transmission.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). Components within a wireless communication system may be coupled (e.g., operatively, communicatively, functionally, electronically, and/or electrically) to each other.

In some wireless communications systems, wireless devices (e.g., UEs) may communicate with one or more other wireless devices using sidelink communication links. In response to a message received over a sidelink communication link, a first wireless device may transmit feedback information to a second wireless device over a sidelink channel. In some cases, however, the first wireless device may be unable to transmit the feedback information in more than one symbol period, which may reduce the likelihood of the second wireless device successfully receiving the feedback information.

SUMMARY

The described techniques relate to improved methods, systems, devices, and apparatuses that support techniques for enhanced sidelink feedback transmission. Generally, the described techniques provide for transmitting sidelink feedback information on resources that span multiple symbol periods in accordance with a feedback resource configuration. A first wireless device (e.g., a user equipment (UE)) may receive a control message indicating a feedback resource configuration for transmitting feedback information over a sidelink feedback channel that includes two or more symbol periods. The feedback resource configuration may include one or more start and length indicator values (SLIVs), one or more bitmaps, or a combination thereof. The first wireless device may receive a sidelink message from a second wireless device (e.g., a UE) over a sidelink shared channel. The first wireless device may transmit the feedback information to the second wireless device based on decoding the sidelink message from the second wireless device. The first wireless device may transmit the feedback information over the sidelink feedback channel using the two or more symbol periods in accordance with the feedback resource configuration.

A method for wireless communications at a first wireless device is described. The method may include receiving a first control message indicating a feedback resource configuration for transmitting feedback information over a sidelink feedback channel, the feedback resource configuration including one or more SLIVs, or one or more bitmaps, or any combination thereof, where the sidelink feedback channel includes two or more symbol periods, receiving a sidelink message from a second wireless device over a sidelink shared channel, and transmitting the feedback information to the second wireless device based on decoding the sidelink message, where the feedback information is transmitted over the sidelink feedback channel using the two or more symbol periods in accordance with the feedback resource configuration.

An apparatus for wireless communications at a first wireless device is described. The apparatus may include at least one processor and memory coupled (e.g., operatively, communicatively, functionally, electronically, or electrically) with the at least one processor, the memory storing instructions executable by the at least one processor to cause the apparatus to receive a first control message indicating a feedback resource configuration for transmitting feedback information over a sidelink feedback channel, the feedback resource configuration including one or more SLIVs, or one or more bitmaps, or any combination thereof, where the sidelink feedback channel includes two or more symbol periods, receive a sidelink message from a second wireless device over a sidelink shared channel, and transmit the feedback information to the second wireless device based on decoding the sidelink message, where the feedback information is transmitted over the sidelink feedback channel using the two or more symbol periods in accordance with the feedback resource configuration.

Another apparatus for wireless communications at a first wireless device is described. The apparatus may include means for receiving a first control message indicating a feedback resource configuration for transmitting feedback information over a sidelink feedback channel, the feedback resource configuration including one or more SLIVs, or one or more bitmaps, or any combination thereof, where the sidelink feedback channel includes two or more symbol periods, means for receiving a sidelink message from a second wireless device over a sidelink shared channel, and means for transmitting the feedback information to the second wireless device based on decoding the sidelink message, where the feedback information is transmitted over the sidelink feedback channel using the two or more symbol periods in accordance with the feedback resource configuration.

A non-transitory computer-readable medium storing code for wireless communications at a first wireless device is described. The code may include instructions executable by at least one processor to receive a first control message indicating a feedback resource configuration for transmitting feedback information over a sidelink feedback channel, the feedback resource configuration including one or more SLIVs, or one or more bitmaps, or any combination thereof, where the sidelink feedback channel includes two or more symbol periods, receive a sidelink message from a second wireless device over a sidelink shared channel, and transmit the feedback information to the second wireless device based on decoding the sidelink message, where the feedback information is transmitted over the sidelink feedback channel using the two or more symbol periods in accordance with the feedback resource configuration.

In some examples of the method, apparatuses, and non-transitory computer-readable medium described herein, the feedback resource configuration includes the one or more SLIVs and the method, apparatuses, and non-transitory computer-readable medium may include further operations, features, means, or instructions for identifying a starting symbol period and a quantity of the two or more symbol periods for transmitting the feedback information based on a SLIV from the one or more SLIVs, where the feedback information may be transmitted to the second wireless device using resources corresponding to the starting symbol period and the quantity of the two or more symbol periods.

Some examples of the method, apparatuses, and non-transitory computer-readable medium described herein may further include operations, features, means, or instructions for receiving, from the second wireless device, a second control message indicating the SLIV for transmitting the feedback information associated with the sidelink message and selecting the SLIV from the one or more SLIVs based on the second control message.

Some examples of the method, apparatuses, and non-transitory computer-readable medium described herein may further include operations, features, means, or instructions for selecting the SLIV from the one or more SLIVs based on a first identifier of the first wireless device, or a second identifier of the second wireless device, or both.

Some examples of the method, apparatuses, and non-transitory computer-readable medium described herein may further include operations, features, means, or instructions for determining a time-domain offset from the starting symbol period based on a first identifier of the first wireless device, a second identifier of the second wireless device, or both, where transmitting the feedback information to the second wireless device may be based on the determined time-domain offset.

In some examples of the method, apparatuses, and non-transitory computer-readable medium described herein, the quantity of the two or more symbol periods for the feedback information may be based on a payload size of the sidelink message.

In some examples of the method, apparatuses, and non-transitory computer-readable medium described herein, the one or more SLIVs correspond to a sidelink resource pool, the sidelink message being received on one or more resources from the sidelink resource pool.

In some examples of the method, apparatuses, and non-transitory computer-readable medium described herein, the feedback resource configuration includes the one or more bitmaps and the method, apparatuses, and non-transitory computer-readable medium may include further operations, features, means, or instructions for identifying a subset of symbol periods from the two or more symbol periods for transmitting the feedback information indicated by a bitmap from the one or more bitmaps, where the feedback information may be transmitted to the second wireless device using the subset of symbol periods.

Some examples of the method, apparatuses, and non-transitory computer-readable medium described herein may further include operations, features, means, or instructions for receiving, from the second wireless device, a second control message indicating the bitmap for transmitting the feedback information associated with the sidelink message and selecting the bitmap from the one or more bitmaps based on the second control message.

Some examples of the method, apparatuses, and non-transitory computer-readable medium described herein may further include operations, features, means, or instructions for selecting the bitmap from the one or more bitmaps based on a first identifier of the first wireless device, or a second identifier of the second wireless device, or both.

In some examples of the method, apparatuses, and non-transitory computer-readable medium described herein, a number of symbol periods of the two or more symbol periods indicated by the bitmap and used for the feedback information may be based on a payload size of the feedback information, content of the feedback information, a reliability metric associated with the feedback information, a metric associated with the bitmap, or any combination thereof.

In some examples of the method, apparatuses, and non-transitory computer-readable medium described herein, the one or more bitmaps correspond to a sidelink resource pool, the sidelink message being received on one or more resources from the sidelink resource pool.

In some examples of the method, apparatuses, and non-transitory computer-readable medium described herein, transmitting the feedback information may include operations, features, means, or instructions for transmitting the feedback information in a same physical resource block (PRB) of each symbol period of the two or more symbol periods and in accordance with the bitmap.

In some examples of the method, apparatuses, and non-transitory computer-readable medium described herein, transmitting the feedback information may include operations, features, means, or instructions for transmitting a repetition of at least a portion of the feedback information during a first symbol period of the two or more symbol periods, the first symbol period preceding a remaining number of symbol periods of the two or more symbol periods that include the feedback information, where the repetition during the first symbol period may be associated with automatic gain control (AGC) procedures.

Some examples of the method, apparatuses, and non-transitory computer-readable medium described herein may further include operations, features, means, or instructions for identifying a second bitmap that indicates a location of the first symbol period within the two or more symbol periods of the sidelink feedback channel.

Some examples of the method, apparatuses, and non-transitory computer-readable medium described herein may further include operations, features, means, or instructions for determining one or more PRBs to use for transmitting the feedback information during the two or more symbol periods based on a first identifier of the first wireless device, a second identifier of the second wireless device, a slot associated with the received sidelink message, a sub-channel associated with the received sidelink message, or any combination thereof, where the feedback information may be transmitted on the one or more PRBs based on the determination.

In some examples of the method, apparatuses, and non-transitory computer-readable medium described herein, the two or more symbol periods may be contiguous in a time-domain.

In some examples of the method, apparatuses, and non-transitory computer-readable medium described herein, the first control message includes a radio resource control (RRC) message, a medium access control (MAC)-control element (CE), downlink control information (DCI), sidelink control information (SCI), or any combination thereof.

A method for wireless communications at a first wireless device is described. The method may include identifying a feedback resource configuration for receiving feedback information over a sidelink feedback channel, the feedback resource configuration including one or more SLIVs, or one or more bitmaps, or any combination thereof, where the sidelink feedback channel includes two or more symbol periods, transmitting a sidelink message to a second wireless device over a sidelink shared channel, and receiving the feedback information from the second wireless device in response to the sidelink message, where the feedback information is received over the sidelink feedback channel using the two or more symbol periods in accordance with the feedback resource configuration.

An apparatus for wireless communications at a first wireless device is described. The apparatus may include at least one processor and memory coupled (e.g., operatively, communicatively, functionally, electronically, or electrically) with the at least one processor, the memory storing instructions executable by the at least one processor to cause the apparatus to identify a feedback resource configuration for receiving feedback information over a sidelink feedback channel, the feedback resource configuration including one or more SLIVs, or one or more bitmaps, or any combination thereof, where the sidelink feedback channel includes two or more symbol periods, transmit a sidelink message to a second wireless device over a sidelink shared channel, and receive the feedback information from the second wireless device in response to the sidelink message, where the feedback information is received over the sidelink feedback channel using the two or more symbol periods in accordance with the feedback resource configuration.

Another apparatus for wireless communications at a first wireless device is described. The apparatus may include means for identifying a feedback resource configuration for receiving feedback information over a sidelink feedback channel, the feedback resource configuration including one or more SLIVs, or one or more bitmaps, or any combination thereof, where the sidelink feedback channel includes two or more symbol periods, means for transmitting a sidelink message to a second wireless device over a sidelink shared channel, and means for receiving the feedback information from the second wireless device in response to the sidelink message, where the feedback information is received over the sidelink feedback channel using the two or more symbol periods in accordance with the feedback resource configuration.

A non-transitory computer-readable medium storing code for wireless communications at a first wireless device is described. The code may include instructions executable by at least one processor to identify a feedback resource configuration for receiving feedback information over a sidelink feedback channel, the feedback resource configuration including one or more SLIVs, or one or more bitmaps, or any combination thereof, where the sidelink feedback channel includes two or more symbol periods, transmit a sidelink message to a second wireless device over a sidelink shared channel, and receive the feedback information from the second wireless device in response to the sidelink message, where the feedback information is received over the sidelink feedback channel using the two or more symbol periods in accordance with the feedback resource configuration.

In some examples of the method, apparatuses, and non-transitory computer-readable medium described herein, the feedback resource configuration includes the one or more SLIVs and the method, apparatuses, and non-transitory computer-readable medium may include further operations, features, means, or instructions for identifying a starting symbol period and a quantity of the two or more symbol periods for receiving the feedback information based on a SLIV from the one or more SLIVs, where the feedback information may be received from the second wireless device using resources corresponding to the starting symbol period and the quantity of the two or more symbol periods.

Some examples of the method, apparatuses, and non-transitory computer-readable medium described herein may further include operations, features, means, or instructions for selecting the SLIV from the one or more SLIVs and transmitting, to the second wireless device, a control message indicating the selected SLIV for the feedback information associated with the sidelink message.

In some examples of the method, apparatuses, and non-transitory computer-readable medium described herein, receiving the feedback information may include operations, features, means, or instructions for receiving the feedback information from the second wireless device based on a time-domain offset from the starting symbol period, the time-domain offset being based on a first identifier of the first wireless device, a second identifier of the second wireless device, or both.

In some examples of the method, apparatuses, and non-transitory computer-readable medium described herein, the quantity of the two or more symbol periods for the feedback information may be based on a payload size of the sidelink message.

In some examples of the method, apparatuses, and non-transitory computer-readable medium described herein, the one or more SLIVs correspond to a sidelink resource pool, the sidelink message being received on one or more resources from the sidelink resource pool.

In some examples of the method, apparatuses, and non-transitory computer-readable medium described herein, the feedback resource configuration includes the one or more bitmaps and the method, apparatuses, and non-transitory computer-readable medium may include further operations, features, means, or instructions for identifying a subset of symbol periods from the two or more symbol periods for receiving the feedback information indicated by a bitmap from the one or more bitmaps, where the feedback information may be received from the second wireless device using the subset of symbol periods.

Some examples of the method, apparatuses, and non-transitory computer-readable medium described herein may further include operations, features, means, or instructions for selecting the bitmap from the one or more bitmaps based on a payload size of the feedback information, content of the feedback information, a reliability metric associated with the feedback information, a metric associated with the bitmap, or any combination thereof and transmitting, to the second wireless device, a control message indicating the bitmap for the feedback information associated with the sidelink message.

In some examples of the method, apparatuses, and non-transitory computer-readable medium described herein, the one or more bitmaps correspond to a sidelink resource pool, the sidelink message being received on one or more resources from the sidelink resource pool.

In some examples of the method, apparatuses, and non-transitory computer-readable medium described herein, receiving the feedback information may include operations, features, means, or instructions for receiving a repetition of at least a portion of the feedback information during a first symbol period of the two or more symbol periods, the first symbol period preceding a remaining number of symbol periods of the two or more symbol periods that include the feedback information, where a location of the first symbol period may be indicated by a second bitmap and performing AGC procedures for receiving the sidelink message based on the repetition during the first symbol period.

DETAILED DESCRIPTION

Figure 1:
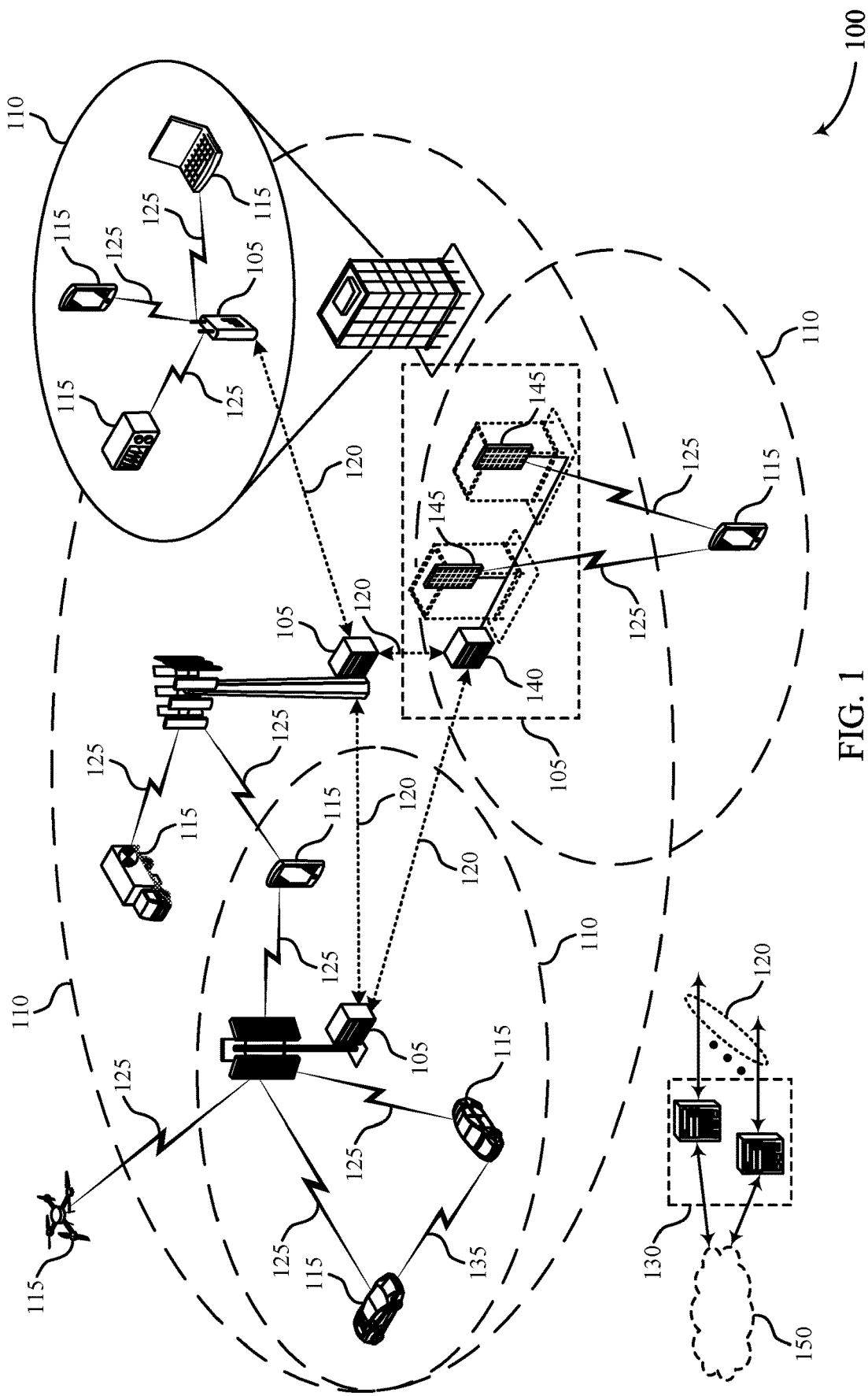
FIG. 1 illustrates an example of a wireless communications system that supports techniques for enhanced sidelink feedback transmission in accordance with aspects of the present disclosure.

Some wireless communication systems, such as fifth generation (5G) New Radio (NR) systems, may support wireless devices establishing an access link (e.g., a Uu interface) or a sidelink (e.g., a PC5 interface), or both. For example, a user equipment (UE) may establish an access link with a base station and a sidelink (e.g., a sidelink communication link) with another UE. In some cases, a UE may establish an access link with a base station and may establish a sidelink with another UE which may operate as a relay (e.g., which has an access link with the same or different base station as the UE) such that the UE may communicate with a network via the access link or the sidelink, or both. Sidelink communications may be referred to as vehicle-to-vehicle (V2V) communications, vehicle-to-everything (V2X) communications, device-to-device (D2D) communications, or other terminology.

In some cases, a first wireless device (e.g., a UE) may transmit a sidelink message to a second wireless device (e.g., a UE) on a physical sidelink shared channel (PSSCH). The second wireless device may be configured to transmit feedback information (e.g., hybrid automatic repeat request (HARQ) acknowledgement (ACK) feedback) for the sidelink message on a physical sidelink feedback channel (PSFCH). Specifically, the second wireless device may transmit the feedback information on one or more physical resource blocks (PRBs) allocated for PSFCH transmissions.

The second wireless device may determine which PRBs to use for transmission of the feedback information based on a mapping between the PSSCH and the PSFCH. In some cases, however, the second wireless device may be unable to transmit the feedback information over more than two symbol periods, where one of the two symbol periods may be used for automatic gain control (AGC) purposes, which may reduce the likelihood of the feedback information being successfully received by the first wireless device. For example, if the second wireless device transmits the feedback information during a first symbol period and transmissions from other wireless devices collide with the feedback information (e.g., signals transmitted by the second wireless device), the first wireless device may be unable to successfully decode the feedback information. In some other examples, the limit on the number of symbol periods used for the PSFCH may likewise prohibit the transmission of additional information with the feedback information on the PSFCH, such as channel state information (CSI).

Aspects of the present disclosure provide for configuring a first wireless device to transmit feedback information for a sidelink message on PSFCH resources (e.g., PRBs allocated for PSFCH transmissions) that span two or more symbol periods, which may increase the likelihood of the feedback information being successfully received. Moreover, the described techniques may enable the first wireless device to transmit additional information (e.g., CSI or other information) in a feedback message on PSFCH resources, which may result in relatively higher throughput and more efficient resource utilization. As an example, the first wireless device may receive a control message indicating a feedback resource configuration for transmitting feedback information on a PSFCH over two or more symbol periods. The first wireless device may receive a sidelink message from a second wireless device over a PSSCH, and the first wireless device may accordingly transmit feedback information for the sidelink message to the second wireless device on the PSFCH over the two or more symbol periods in accordance with the feedback resource configuration.

In some examples, the feedback resource configuration may include a start and length indicator value (SLIV) that indicates a starting symbol period and a quantity of symbol periods to use for transmission of the feedback information. In other examples, the feedback resource configuration may include a bitmap that indicates specific symbol periods to use for transmission of the feedback information. The first wireless device may transmit the feedback information (e.g., HARQ-ACK feedback, CSI) on the PSFCH over the two or more symbol periods in accordance with the SLIV or the bitmap. In some examples, the first wireless device may determine a time-domain offset or a set of PRBs to use for transmission of the feedback information based on an identifier of the first wireless device, an identifier of the second wireless device, or both. The techniques described herein may result in relatively higher communication reliability, relatively fewer signal collisions, and more efficient utilization of communication resources, among other benefits.

Aspects of the disclosure are initially described in the context of wireless communications systems, resource diagrams, resource mappings, and process flows. Aspects of the disclosure are further illustrated by and described with reference to apparatus diagrams, system diagrams, and flowcharts that relate to techniques for enhanced sidelink feedback transmission.

FIG. 1 illustrates an example of a wireless communications system 100 that supports techniques for enhanced sidelink feedback transmission in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a device such as a cellular phone, a smart phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may also refer to a wireless local loop (WLL) station, an Internet of Things (IoT) device, an Internet of Everything (IoE) device, or a machine type communication (MTC) device, or the like, which may be implemented in various articles such as appliances, drones, robots, vehicles, meters, or the like.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as category (CAT) M or CAT M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), and NB-IoT may include eNB-IoT (enhanced NB-IoT), and FeNB-IoT (further enhanced NB-IoT).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a quantity of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time-domain) into subframes, and each subframe may be further divided into a quantity of slots. Alternatively, each frame may include a variable number of slots, and the number of slots may depend on subcarrier spacing. Each slot may include a quantity of symbol periods (e.g., depending on the length of the cyclic prefix prepended to each symbol period). In some wireless communications systems, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time-domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a quantity of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a quantity of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RB)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW)

communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a quantity of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some wireless communications systems, a first wireless device (e.g., a UE 115 or a base station 105) may transmit a sidelink message to a second wireless device (e.g., a UE 115) on a PSSCH. The second wireless device may be configured to transmit feedback information (e.g., HARQ-ACK feedback) for the sidelink message on a PSFCH. Specifically, the second wireless device may transmit the feedback information on one or more PRBs allocated for PSFCH transmissions. The second wireless device may determine which PSFCH resources to use for transmission of the feedback information based on a mapping between the PSSCH and the PSFCH.

In some cases, however, the second wireless device may be unable to transmit the feedback information over more than one symbol period (equivalently referred to herein as a symbol or an OFDM symbol), which may reduce the likelihood of the feedback information being successfully received by the first wireless device. For example, if the second wireless device transmits the feedback information during a first symbol period and transmissions from other wireless devices collide with the feedback information (e.g., signals transmitted by the second wireless device during the first symbol period), the first wireless device may be unable to successfully decode the feedback information.

The wireless communications system 100 may support techniques for improved communication reliability and fewer signal collisions by configuring the second wireless device to transmit sidelink feedback information on PSFCH resources that span multiple symbol periods. For example, the techniques described herein may enable a first wireless device (e.g., a UE 115) to transmit feedback information (e.g., HARQ-ACK feedback) over three or more OFDM symbol periods, which may increase the likelihood of other devices successfully receiving the feedback information (e.g., by providing greater temporal diversity). Moreover, the first wireless device may transmit other information (e.g., CSI) on the PSFCH resources, which may enable the first wireless device to attain higher throughput levels.

The wireless communications system 100 may also support techniques for decreasing collisions between sidelink feedback transmissions (e.g., PSFCH transmissions) from different wireless devices. For example, if two wireless devices (e.g., UEs 115) are assigned to the same PSSCH resources, a control node (e.g., a base station 105 or a UE 115) may use a SLIV or a bitmap (equivalently referred to herein as a time-domain bitmap) to allocate different PSFCH resources to the wireless devices (e.g., such that PSFCH transmissions from the wireless devices are separated in time). Using a SLIV or a bitmap to separate PSFCH transmissions from the wireless devices (e.g., in the time-domain) may result in greater communication reliability and fewer signal collisions, among other benefits.

Figure 2:
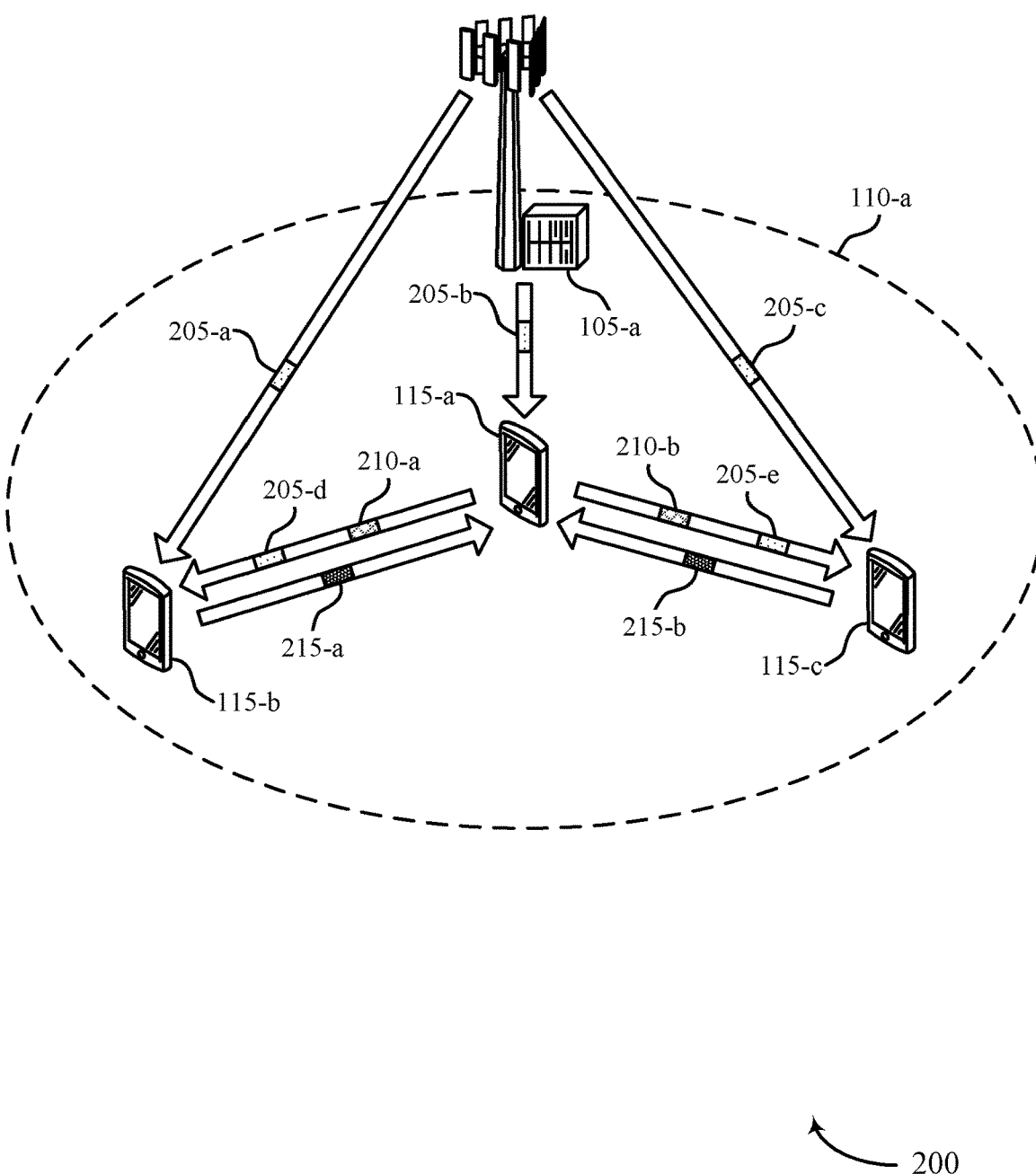
FIG. 2 illustrates an example of a wireless communications system that supports techniques for enhanced sidelink feedback transmission in accordance with aspects of the present disclosure.

FIG. 2 illustrates an example of a wireless communications system 200 that supports techniques for enhanced sidelink feedback transmission in accordance with aspects of the present disclosure. The wireless communications system 200 may implement or be implemented by aspects of the wireless communications system 100. For example, the wireless communications system 200 may include a base station 105-a, a UE 115-a, a UE 115-b, and a UE 115-c, which may be examples of corresponding devices described with reference to FIG. 1. The base station 105-a and the UEs 115 may communicate within a geographic coverage area 110-a, which may be an example of a geographic coverage area 110 described with reference to FIG. 1. In the wireless communications system 200, the base station 105-a or the UE 115-a (e.g., a primary UE) may configure one or both of the UE 115-b and the UE 115-c to transmit sidelink feedback information over two or more symbol periods.

In some wireless communications systems, a UE 115 may be configured to transmit feedback information on PSFCH resources that span two symbol periods (e.g., symbols, OFDM symbols). One of the two symbol periods may be used for AGC training, and the other symbol period may be used for HARQ-ACK feedback. This may effectively result in a one symbol PSFCH transmission. In general, PSFCH transmissions may be performed over one or more OFDM symbol periods (e.g., in addition to AGC symbol periods). AGC may refer to techniques used by a receiving device for mitigating a relatively unpredictable signal power and other aspects (e.g., interfering signals, issues resulting from multi-path fading) of a received signal. AGC may enable a receiving device to modify a gain of a received signal to minimize or avoid, for example, quantization errors and/or reduce the effects of interfering signals.

Aspects of the present disclosure provide for transmitting feedback information over PSFCH using additional symbol periods (e.g., multiple symbol periods), which may improve HARQ-ACK reliability (e.g., by enabling multiple HARQ-ACK repetitions) and help maintain URLLC quality of service (QoS) requirements. In addition, to further improve transmission reliability, a UE 115 may be able to derive CSI from PSSCH transmissions. Thus, PSFCH resources may be used for reporting CSI (e.g., in addition to HARQ-ACK feedback). To support CSI reporting on PSFCH resources, a UE 115 may be configured to transmit PSFCH over a larger quantity of symbol periods using a larger quantity of PRBs.

URLLC and industrial IoT (IIoT) services may have a diverse set of latency and reliability requirements. With the expansion of sidelink to non-V2X use cases such as IIoT and consumer use cases (e.g., XR, smart wearables), improved sidelink schemes may support low latency and high reliability communications. The PSFCH improvements described herein may support sidelink for consumer use cases and URLLC and IIoT applications as well as MU-MIMO scenarios. Allocating more OFDM symbol periods for PSFCH may enable a controller (e.g., a base station in sidelink mode 1 or a primary UE) to assign the same PSSCH resources to two UEs (e.g., in accordance with a MU-MIMO communication scheme) and separate PSFCH feedback transmissions from the two UEs in the time-domain using a bitmap or a SLIV. Specifically, the controller may allocate orthogonal time-domain resources to the two UEs, which may reduce the likelihood of collisions between PSFCH transmissions from the two UEs.

Aspects of the present disclosure provide for configuring UEs with PSFCH allocations that span multiple symbol periods. Aspects of the present disclosure also provide for assigning UEs to different OFDM symbol periods to mitigate collisions between PSFCH transmissions from UEs that utilize the same PSSCH resources (e.g., PSSCH resources that overlap in time or frequency). Additionally, the techniques described herein may enable sidelink UEs to determine which PRBs to use for PSFCH transmissions (e.g., for MU-MIMO schemes).

In the example of FIG. 2, the base station 105-a may transmit control messages 205 to the UEs 115. For example, the base station 105-a may transmit a control message 205-a to the UE 115-b, and may transmit a control message 205-c to the UE 115-c. Similarly, the base station 105-a may transmit a control message 205-b to the UE 115-a (e.g., a primary UE). Additionally or alternatively, the UE 115-a may transmit control messages 205 to the UE 115-b or the UE 115-c. For example, the UE 115-a may transmit a control message 205-d to the UE 115-b, and may transmit a control message 205-e to the UE 115-c. The control messages 205 may indicate one or more SLIVs, one or more bitmaps (e.g., time-domain bitmaps), or a combination thereof.

In turn, the UEs 115 may exchange sidelink messages 210. For example, the UE 115-a may transmit a sidelink message 210-a to the UE 115-b, and the UE 115-a may transmit a sidelink message 210-b to the UE 115-c. Likewise, the UE 115-b may transmit sidelink messages 210 to the UE 115-a or the UE 115-c, and the UE 115-c may transmit sidelink messages 210 to the UE 115-a or the UE 115-b. In some aspects, the base station 105-a may schedule resources used for the sidelink messages 210 (e.g., in accordance with sidelink mode 1 operations). In some examples, the UEs 115 may receive sidelink messages 210 on the same PSSCH resources (e.g., resources that overlap in time or frequency).

Accordingly, the UEs 115 may transmit feedback information 215 for the sidelink messages 210 on PSFCH resources indicated by the control messages 205. For example, the UE 115-b may transmit feedback information 215-a for the sidelink message 210-a on PSFCH resources indicated by the control message 205-a (e.g., from the base station 105-a) or the control message 205-d (e.g., from the UE 115-a). Likewise, the UE 115-c may transmit feedback information 215-b for the sidelink message 210-b on PSFCH resources indicated by the control message 205-c (e.g., from the base station 105-a) or the control message 205-e (e.g., from the UE 115-a).

The wireless communications system 200 may support techniques for improved communication reliability and fewer signal collisions, among other benefits. For example, the techniques described herein may enable a first wireless device (e.g., the UE 115-b or the UE 115-c) to transmit feedback information (e.g., HARQ-ACK feedback) on PSFCH resources that span multiple OFDM symbol periods, which may increase the likelihood of other devices (e.g., the UE 115-a) successfully receiving the feedback information (e.g., by providing greater temporal diversity). Moreover, the first wireless device may transmit other information (e.g., CSI) on the PSFCH resources, which may enable the first wireless device to attain higher throughput levels.

The wireless communications system 100 may also support techniques for decreasing collisions between sidelink feedback transmissions (e.g., PSFCH transmissions) from different wireless devices. For example, if two wireless devices (e.g., the UE 115-b and the UE 115-c) are assigned to the same PSSCH resources, a control node (e.g., the base station 105-a or the UE 115-a) may use a SLIV or a bitmap to allocate different PSFCH resources to the wireless devices (e.g., such that PSFCH transmissions from the wireless devices are separated in time). Using a SLIV or a bitmap to separate PSFCH transmissions from the wireless devices (e.g., in the time-domain) may result in greater communication reliability and fewer signal collisions, among other benefits.

Figure 3A:
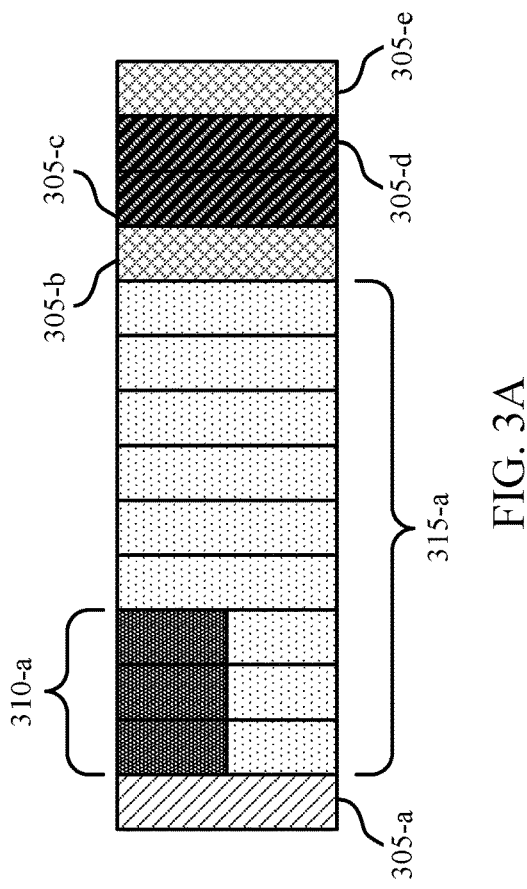
FIGS. 3A and 3B illustrate examples of resource diagrams that support techniques for enhanced sidelink feedback transmission in accordance with aspects of the present disclosure.
Figure 3B:
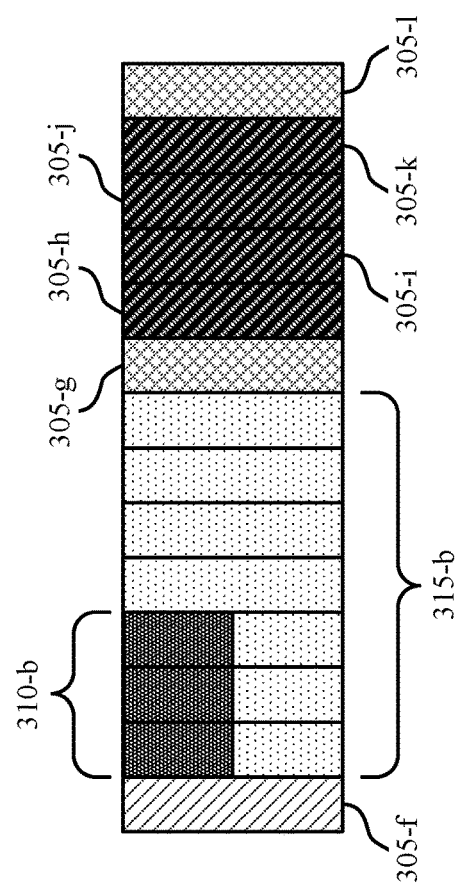

FIGS. 3A and 3B illustrate examples of a resource diagram 300 and a resource diagram 301 that support techniques for enhanced sidelink feedback transmission in accordance with aspects of the present disclosure. The resource diagram 300 and the resource diagram 301 may implement or be implemented by aspects of the wireless communications system 100 or the wireless communications system 200. For example, the resource diagram 300 or the resource diagram 301 may be implemented by a UE or a base station, which may be examples of corresponding devices described with reference to FIGS. 1 and 2. The resource diagram 300 may illustrate an example of a sidelink communication scheme in which a wireless device is configured to transmit sidelink feedback information over two symbol periods, and the resource diagram 301 may illustrate an example of a sidelink communication scheme in which a wireless device is configured to transmit sidelink feedback information over more than two symbol periods.

In some wireless communications systems, sidelink communications may support and/or be used for URLLC and IIoT applications. As such, enhancing PSFCH may increase the reliability of HARQ-ACK transmissions and enable devices to transmit CSI (e.g., CQI, RI, power commands) on PSFCH resources, which may reduce the latency associated with CSI reporting. Some wireless communications systems may support slot structures without sidelink feedback resources. A slot may include 14 OFDM symbol periods. However, sidelink resources may be configured (e.g., preconfigured) to occupy fewer than 14 symbol periods in a slot. A first symbol period of the slot may be repeated (e.g., during a preceding symbol period) for AGC settling. In some cases, a gap symbol period may be included after a PSSCH in the slot. Further, a sub-channel size may be configured to a quantity of PRBs (e.g., 10, 15, 20, 25, 50, 75, or 100 PRBs), and physical sidelink control channel (PSCCH) transmissions (e.g., sidelink control information) and PSSCH (e.g., sidelink data) may be transmitted in the same slot.

Additionally or alternatively, some wireless communications systems may support slot structures with sidelink feedback resources, for example, associated with a PSFCH. The resource diagram 300 and the resource diagram 301 may illustrate examples of such slot structures. Resources for PSFCH may be configured with a period of slots (e.g., 0, 1, 2, or 4 slots). In some resource configurations, two OFDM symbol periods may be dedicated to PSFCH, where a first OFDM symbol period of the PSFCH may include a repetition of the second symbol period (e.g., for AGC settling). For example, a PSFCH transmission may be repeated during a preceding symbol period for AGC settling. In some cases, a gap symbol period may be included after PSSCH and before PSFCH (e.g., to enable radio retuning at a device). In some cases, however, the two symbol PSFCH resource allocation may not be sufficient for some applications, and may potentially result in loss of PSFCH and collisions between PSFCH transmissions.

The techniques described herein provide for increasing the size of PSFCH resource allocations from two symbol periods (e.g., where one symbol period is used for transmission of HARQ-ACK and one symbol period is used for AGC) to X+1 symbol periods, where X is greater than or equal to 1 and a value of 1 may be configured as a default value. The first symbol period of this PSFCH resource allocation may be used for AGC, and may include a repetition of the second symbol period (e.g., the first symbol period of the X symbol periods dedicated to PSFCH). In some examples, a base station may configure a resource pool with the X+1 symbol periods used for PSFCH, where X=1 may be configured as a default value.

In the example of FIG. 3A, a symbol period 305-a (e.g., a first symbol period) of a slot may be reserved for AGC. After the symbol period 305-a, a quantity of symbol periods (e.g., nine symbol periods) may be allocated for a PSSCH transmission 315-a. In some examples, the PSSCH transmission 315-a (e.g., sidelink data) may be multiplexed with a PSCCH transmission 310-a (e.g., sidelink control information) using FDM. There may be a gap symbol period 305-b between the PSSCH transmission 315-a and PSFCH resources corresponding to the PSSCH transmission 315-a. After the gap symbol period 305-b, a symbol period 305-c and a symbol period 305-d (e.g., two symbol periods) may be allocated for PSFCH transmissions. In some examples, the symbol period 305-c may be or may include a repetition of the symbol period 305-d. This repetition may be used for AGC training at a PSFCH receiving device (e.g., a device that receives a message (e.g., feedback information) over a PSFCH, which may be referred to as a PSFCH receiver). After the symbol period 305-d, there may be a gap symbol period 305-e between the slot and a subsequent slot.

In the example of FIG. 3B, a symbol period 305-f (e.g., a first symbol period) may be reserved for AGC. After the symbol period 305-f, a quantity of symbol periods (e.g., seven symbol periods) may be allocated for a PSSCH transmission 315-b. In some examples, the PSSCH transmission 315-b (e.g., sidelink data) may be multiplexed with a PSCCH transmission 310-b (e.g., sidelink control information) using FDM. There may be a gap symbol period 305-g between the PSSCH transmission 315-b and PSFCH resources corresponding to the PSSCH transmission 315-b. After the gap symbol period 305-g, a symbol period 305-h, a symbol period 305-i, a symbol period 305-j, and a symbol period 305-k (e.g., four symbol periods) may be allocated for PSFCH transmissions. In some examples, the symbol period 305-h may be used for AGC training at a PSFCH receiving device, and may include a repetition of the symbol period 305-i. After the symbol period 305-k, there may be a gap symbol period 305-1 between the slot and a subsequent slot.

In comparison to the resource diagram 300 (e.g., in which two symbol periods are allocated for PSFCH transmissions), the resource diagram 301 may provide greater throughput and improved communication reliability. For example, allocating multiple (e.g., two or more, three or more) symbol periods 305 for PSFCH transmissions may enable a PSFCH transmitting device (e.g., a device that transmits a message (e.g., feedback information) over a PSFCH, which may be referred to as a PSFCH transmitter) to report CSI during one or more of the symbol periods 305. In addition, allocating more symbol periods 305 to PSFCH transmissions may enable a controlling device (e.g., a base station) to separate PSFCH transmissions from different devices using a SLIV or a bitmap, which may reduce the likelihood of collisions between PSFCH transmissions.

The resource diagram 300 and the resource diagram 301 may support techniques for improved communication reliability and fewer signal collisions, among other benefits. For example, the techniques described herein may enable a first wireless device (e.g., a UE) to transmit feedback information (e.g., HARQ-ACK feedback) on PSFCH resources that span multiple OFDM symbol periods, which may increase the likelihood of other devices successfully receiving the feedback information (e.g., by providing greater temporal diversity). Moreover, the first wireless device may transmit other information (e.g., CSI) on the PSFCH resources, which may enable the first wireless device to attain higher throughput levels.

The resource diagram 300 and the resource diagram 301 may also support techniques for decreasing collisions between sidelink feedback transmissions (e.g., PSFCH transmissions) from different wireless devices. For example, if two wireless devices (e.g., UEs) are assigned to the same PSSCH resources, a control node (e.g., a base station or a UE) may use a SLIV or a bitmap to allocate different PSFCH resources to the wireless devices (e.g., such that PSFCH transmissions from the wireless devices are separated in time). Using a SLIV or a bitmap to separate PSFCH transmissions from the wireless devices (e.g., in the time-domain) may result in greater communication reliability and fewer signal collisions, among other benefits.

Figure 4A:
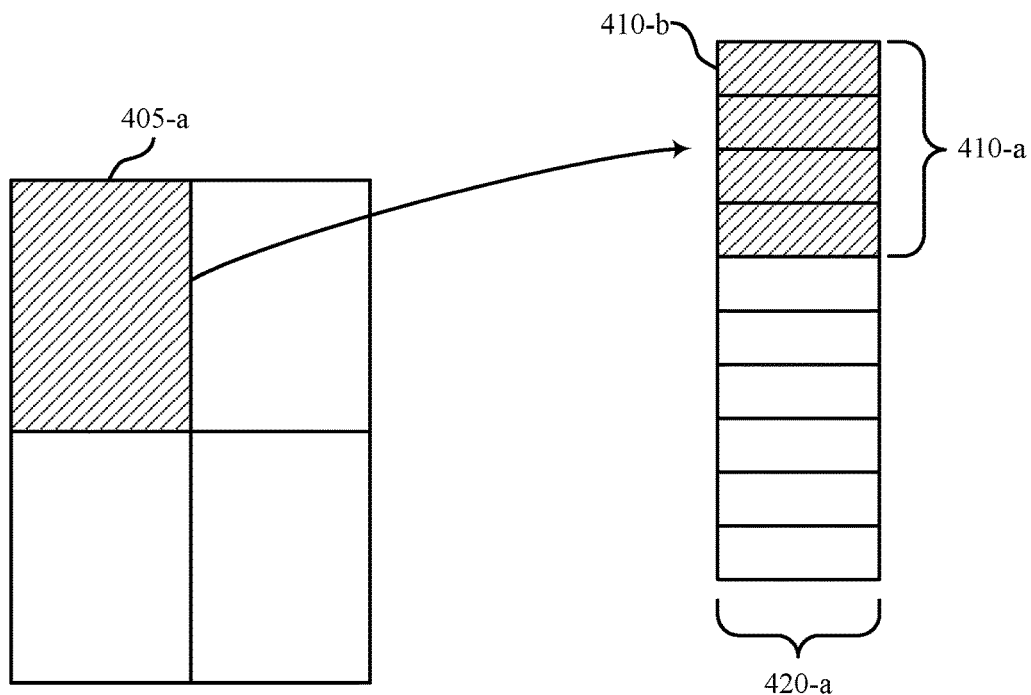
FIGS. 4A and 4B illustrate examples of resource mappings that support techniques for enhanced sidelink feedback transmission in accordance with aspects of the present disclosure.
Figure 4B:
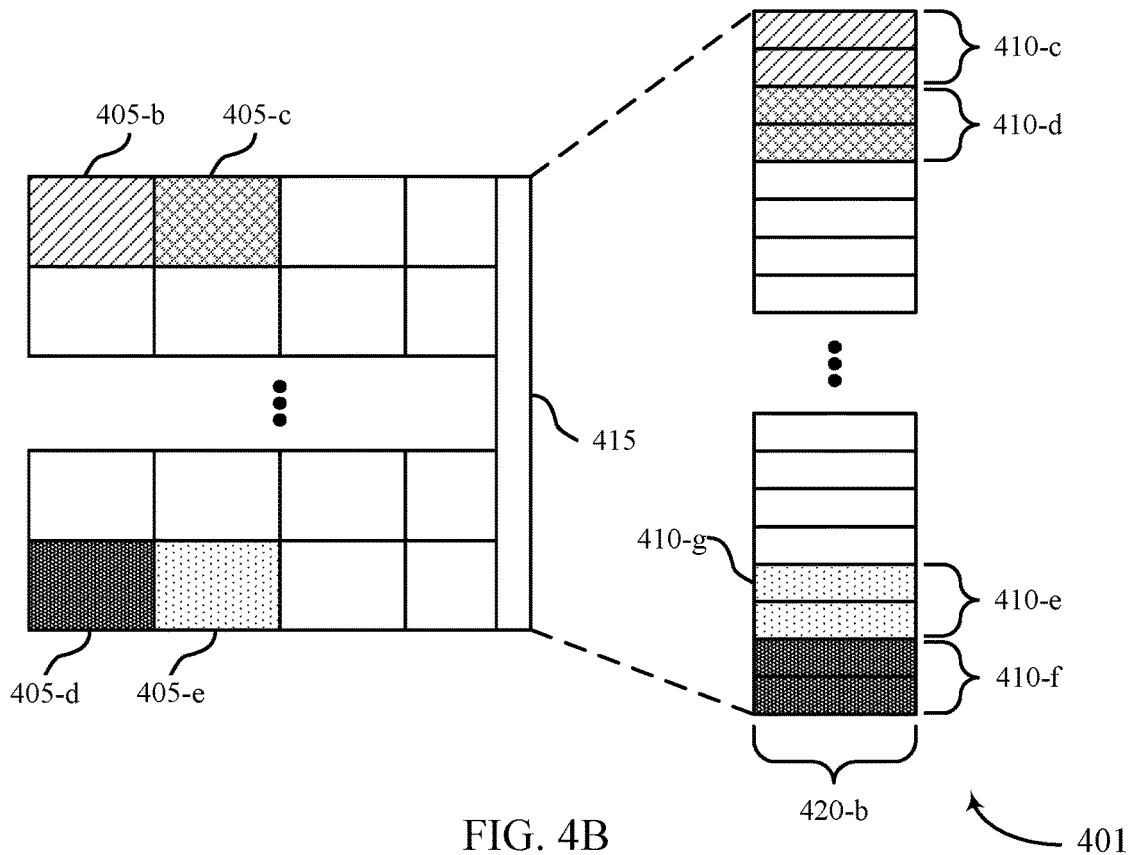

FIGS. 4A and 4B illustrate examples of a resource mapping 400 and a resource mapping 400 that support techniques for enhanced sidelink feedback transmission in accordance with aspects of the present disclosure. The resource mapping 400 and the resource mapping 401 may implement or be implemented by aspects of the wireless communications system 100 or the wireless communications system 200. For example, the resource mapping 400 and the resource mapping 401 may be implemented by a UE or a base station, which may be examples of corresponding devices described with reference to FIGS. 1 and 2. The resource mapping 400 and the resource mapping 401 may support techniques for enhanced PSFCH transmission.

Some wireless communications systems may support PSFCH resource mapping functions. These PSFCH resource mapping functions may define mappings between PSSCH resources 405 and corresponding PSFCH resources 410. The PSFCH resource mapping functions may be based on a starting sub-channel (e.g., frequency band) of a PSSCH resource (e.g., if sl-PSFCH-CandidateResourceType is configured as startSubCH), a quantity of sub-channels in a PSSCH resource (e.g., if sl-PSFCH-CandidateResourceType is configured as allocSubCH), a slot in which a PSSCH resource is located, a source identifier (e.g., the identifier of a device transmitting a message on PSSCH, which may be referred to as a PSSCH transmitting device), a destination identifier (e.g., the identifier of a device receiving the message on the PSSCH, which may be referred to as a PSSCH receiving device), or the function i=mod(source identifier+destination identifier, X), where X is the number of PRBs determined from a slot index and either a starting sub-channel index or a quantity of sub-channels. In such examples, the number of available PSFCH resources may be equal to or greater than a quantity of UEs (e.g., in groupcast option 2).

A UE may determine PSFCH resources based on a quantity of parameters and functions. For example, a first parameter (e.g., periodPSFCHresource) may indicate a PSFCH periodicity (e.g., in slots) within a resource pool. The first parameter may be set to different values (e.g., 0,1,2, or 4). If the first parameter is set to 0, PSFCH transmissions from a UE in the resource pool may be disabled. A UE may transmit PSFCH in a first slot that includes PSFCH resources and is at least a quantity of slots (e.g., provided by MinTimeGapPSFCH) after a last slot of PSSCH reception (e.g., within the resource pool). A second parameter (e.g., rbSetPSFCH) may indicate a set of $M_{PRB,set}^{PSFCH}$ in a resource pool that are configured for PSFCH transmission, where $M_{PRB,set}^{PSFCH} = \alpha \cdot N_{subch} \cdot N_{PSSCH}^{PSFCH}$. A third parameter (e.g., numSubchannel) may indicate a quantity of $N_{subch}$ sub-channels for the resource pool. A fourth parameter (e.g., $N_{PSSCH}^{PSFCH}$) may indicate a quantity of PSSCH slots associated with a PSFCH slot, and may be derived from the first parameter (e.g., periodPSFCHresource). A fifth parameter (e.g., $M_{subch,slot}^{PSFCH}$) may be derived from the second parameter according to the expression $$M_{subch,slot}^{PSFCH} = \frac{M_{PRB,set}^{PSFCH}}{N_{subch} \cdot N_{PSSCG}^{PSFCH}}.$$

Accordingly, a UE may allocate $[(i+j \cdot N_{PSSCH}^{PSFCH}) \cdot M_{subch,slot}^{PSFCH}, (i+1+j \cdot N_{PSSCH}^{PSFCH}) \cdot M_{subch,slot}^{PSFCH} - 1]$ PRBs to slot i and sub-channel j, where $0 \leq i \leq N_{PSSCH}^{PSFCH}$ and $0 \leq j \leq N_{subch}$. As an example, if $N_{PSSCH}^{PSFCH} = 4$ (e.g., if the PSFCH periodicity is 4 slots) and $N_{subch} = 10$ (e.g., if there are 10 sub-channels for the resource pool), then $M_{subch,slot}^{PSFCH} = 80/(4*10) = 2$ (e.g., 80 PRBs may be configured for PSFCH transmissions). In some examples, PSFCH may be transmitted on one PRB, even if each sub-channel is associated with 2 PSFCH PRBs. In such examples, a UE may determine which PRB to use based on the expression i=mod(source identifier+destination identifier, 2).

In the example of FIG. 4A, a first wireless device may receive a sidelink message on PSSCH resources 405-a. Accordingly, the first wireless device may transmit feedback information (e.g., HARQ-ACK feedback) for the sidelink message on PSFCH resources corresponding to the PSSCH resources 405-a. For example, the first wireless device may transmit feedback information on PRBs 410-a over a symbol period 420-a. In some examples, the first wireless device may identify these PSFCH resources based on receiving a control message from a second wireless device (e.g., a base station or a primary UE). The control message may include one or more SLIVs, one or more bitmaps, or a combination thereof. In some examples, the first wireless device may only transmit feedback information for the sidelink message on a PRB 410-b (e.g., a single PRB), even if multiple PRBs are configured for PSFCH transmissions.

In the example of FIG. 4B, one or more wireless devices may receive sidelink messages on PSSCH resources 405. For example, a first wireless device may receive a first sidelink message on PSSCH resources 405-b, a second wireless device may receive a second sidelink message on PSSCH resources 405-c, a third wireless device may receive a third sidelink message on PSSCH resources 405-d, and a fourth wireless device may receive a fourth sidelink message on PSSCH resources 405-e. These wireless devices may transmit feedback information (e.g., HARQ-ACK feedback) for the sidelink messages on PSFCH resources 415 over a symbol period 420-b. Specifically, the first wireless device may transmit feedback information for the first sidelink message on PRBs 410-c, the second wireless device may transmit feedback information for the second sidelink message on PRBs 410-d, the third wireless device may transmit feedback information for the third sidelink message on PRBs 410-e, and the fourth wireless device may transmit feedback information for the fourth sidelink message on PRBs 410-f.

In some examples, the wireless devices may only transmit the feedback information on a single PRB, even if multiple PRBs are configured for PSFCH transmissions. For example, the third wireless device may only transmit feedback information for the third sidelink message on a PRB 410-g (e.g., as opposed to transmitting the feedback information on each of the PRBs 410-e). The wireless devices may determine which PRBs to use for feedback transmission based on receiving control messages from a base station or a primary UE, or both. Additionally or alternatively, the wireless devices may determine which PRBs to use for feedback transmission based on a source identifier, a destination identifier, a summation of the source identifier and the destination identifier, or a combination thereof.

The resource mapping 400 and the resource mapping 401 may support techniques for improved communication reliability and fewer signal collisions, among other benefits. For example, the techniques described herein may enable a first wireless device (e.g., a UE) to transmit feedback information (e.g., HARQ-ACK feedback) on PSFCH resources that span multiple OFDM symbol periods, which may increase the likelihood of other devices successfully receiving the feedback information (e.g., by providing greater temporal diversity). Moreover, the first wireless device may transmit other information (e.g., CSI) on the PSFCH resources, which may enable the first wireless device to attain higher throughput.

The resource mapping 400 and the resource mapping 401 may also support techniques for decreasing collisions between sidelink feedback transmissions (e.g., PSFCH transmissions) from different wireless devices. For example, if two wireless devices (e.g., UEs) are assigned to the same PSSCH resources, a control node (e.g., a base station or a UE) may use a SLIV or a bitmap to allocate different PSFCH resources to the wireless devices (e.g., such that PSFCH transmissions from the wireless devices are separated in time). Using a SLIV or a bitmap to separate PSFCH transmissions from the wireless devices (e.g., in the time-domain) may result in greater communication reliability and fewer signal collisions, among other benefits.

Figure 5:
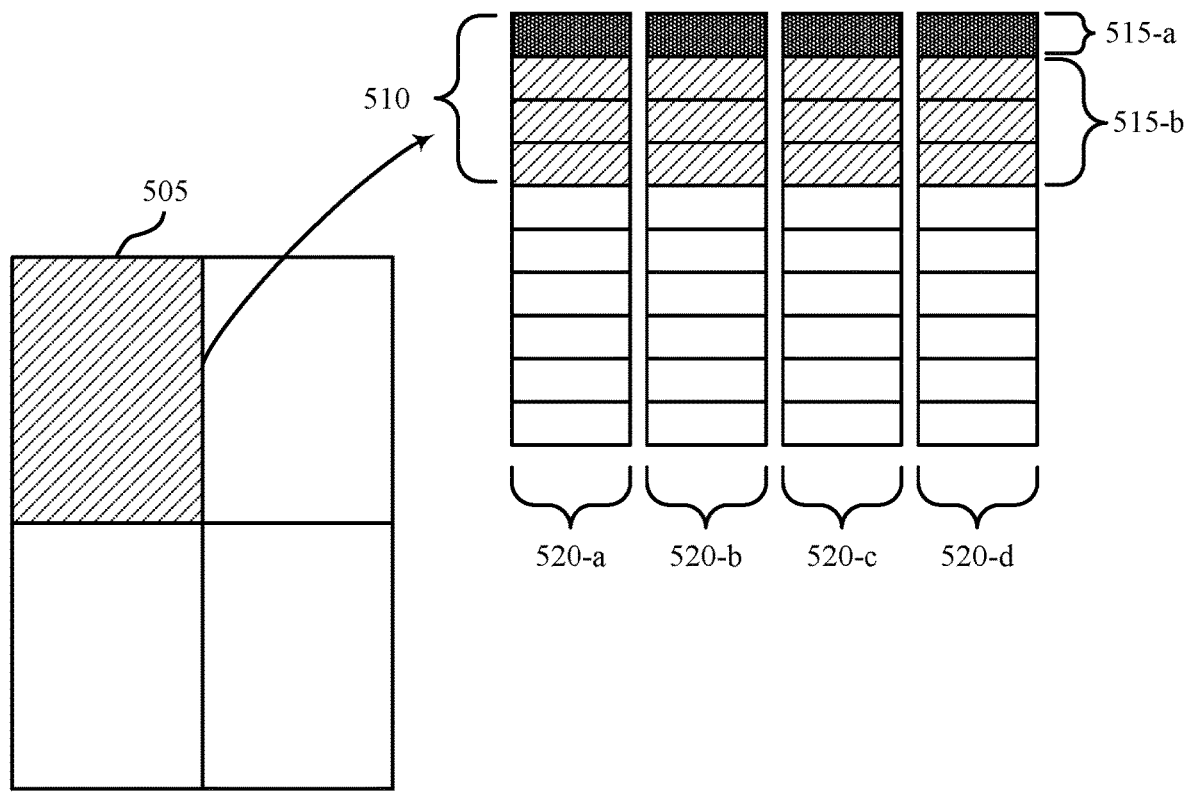
FIGS. 5 and 6 illustrate examples of resource mappings that support techniques for enhanced sidelink feedback transmission in accordance with aspects of the present disclosure.

FIG. 5 illustrates an example of a resource mapping 500 that supports techniques for enhanced sidelink feedback transmission in accordance with aspects of the present disclosure. The resource mapping 500 may implement or be implemented by aspects of the wireless communications system 100 or the wireless communications system 200. For example, the resource mapping 500 may be implemented by a base station or a UE, which may be examples of corresponding devices described with reference to FIGS. 1 and 2. The resource mapping 500 may illustrate an example of how a SLIV may be used to identify PSFCH resources 510 corresponding to PSSCH resources 505.

As described herein, a SLIV may be used to indicate PSFCH resources that span two or more symbol durations. Having relatively more OFDM symbol periods configured for PSFCH may enable a controller (e.g., a base station in sidelink mode 1, a primary UE, a programmable logic controller (PLC), or a relay UE) to assign the same PSSCH resources to two UEs (e.g., in accordance with a MU-MIMO communication scheme) and further enable separate PSFCH transmissions from the two UEs in the time-domain using a bitmap or a SLIV. A SLIV may be used to indicate a starting OFDM symbol period and a quantity of OFDM symbol periods for a PSFCH transmitter (e.g., a UE that receives a PSSCH transmission) to use for transmitting a feedback message and may support contiguous OFDM symbol usage.

As an example, a base station may configure each UE with a SLIV to be used for identifying PSFCH resources. The base station may indicate the SLIV via RRC signaling or a MAC-CE. The UEs may jointly determine which SLIV to use during RRC establishment or via a MAC-CE. Alternatively, the base station may configure the SLIV per resource pool (e.g., during RRC configuration). That is, the base station may configure multiple SLIVs and subsequently indicate (e.g., select) one of the configured SLIVs. In other examples, the base station may configure all resource pools with the same SLIVs. This may be signaled either by a transmitting UE (e.g., signaled in SCI-2 or SCI-1) or by a receiving UE based on a source identifier (e.g., an identifier of the transmitting UE), a destination identifier (e.g., an identifier of the receiving UE), a summation of the source identifier and the destination identifier, or a combination thereof.

In some examples, the length of a SLIV may be based on a payload size of a corresponding PSSCH transmission. Specifically, there may be a correlation between the number of bits in the PSSCH transmission and the number of symbol periods to be used by the receiving UE for PSFCH transmission. That is, if a payload of the PSSCH transmission is L bits and one RB is selected for each OFDM symbol period, the receiving UE may use Y=L OFDM symbol periods for PSFCH transmission. The L bits may include one bit for HARQ-ACK (e.g., pertaining to the PSSCH transmission) and remaining bits may be used for CSI reporting. If, for example, a resource pool is configured with a specific PSFCH size, the receiving UE (e.g., the UE transmitting PSFCH) may determine which PSFCH resources to used based on a payload size of the corresponding PSSCH transmission or based on a configuration received from the transmitting UE (e.g., the UE transmitting PSSCH).

In some examples, the resource pool configuration may indicate only a start symbol period. Assuming that one SLIV is configured, a UE may generate a SLIV offset (e.g., a time-domain offset added to the starting symbol period). The SLIV offset can be determined based on UE identifiers (e.g., a source identifier or a destination identifier). The ending symbol period may not exceed a total number of PSFCH OFDM symbol periods. Thus, a UE may use the expression mod(source identifier+destination identifier, (number of PSFCH symbol periods−configured length in SLIV)) to identify PSFCH resources. For example, if a SLIV indicates a fourth symbol period and a seventh symbol period (e.g., of a slot) as the starting and ending symbol periods for PSFCH transmission, a UE may determine an offset and add it to the starting symbol period and the ending symbol period (e.g., 4+offset to 7+offset).

In the example of FIG. 5, a first wireless device may receive a sidelink message on PSSCH resources 505. Accordingly, the first wireless device may transmit feedback information (e.g., HARQ-ACK feedback) for the sidelink message on PSFCH resources 510. Specifically, the first wireless device may transmit the feedback information on one or more PRBs 515 over one or more symbol periods 520. The first wireless device may determine which PRBs 515 and which symbol periods 520 to use for transmitting the feedback information based on receiving a control message from a base station or a primary UE. As described herein, the control message may include one or more SLIVs or bitmaps that indicate which symbol periods 520 to use for PSFCH transmissions. The first wireless device may determine which PRBs 515 to use for transmitting the feedback information based on a source identifier (e.g., an identifier of a device from which the first wireless device received the sidelink message), a destination identifier (e.g., the identifier of the first wireless device), a summation of the source identifier and the destination identifier, or a combination thereof.

In some examples, the control message may include a SLIV that indicates a symbol period 520-a (e.g., a starting symbol period) and a quantity of symbol periods 520 configured for PSFCH transmission. In other examples, the control message may include a bitmap that indicates a specific combination of symbol periods 520 configured for PSFCH transmission. For example, the bitmap may indicate that the symbol period 520-a and a symbol period 520-c are allocated for PSFCH transmissions. In contrast, the bitmap may indicate that a symbol period 520-b and a symbol period 520-d are not allocated for PSFCH transmissions from the first wireless device.

In some examples, the first wireless device may determine which symbol periods 520 to use for PSFCH transmission based on a payload size of the sidelink message. If, for example, the first wireless device receives an indication of a bitmap indicating PSFCH resources to be used for transmitting the feedback information, the first wireless device may transmit the feedback information in the same PRB for each of the symbol periods 520 configured for PSFCH transmissions. That is, the first wireless device may transmit the feedback information in a PRB 515-a, and may refrain from transmitting the feedback information in PRBs 515-b, even if the PRBs 515-b are allocated for PSFCH transmissions from the first wireless device.

The resource mapping 500 may support techniques for improved communication reliability and fewer signal collisions, among other benefits. For example, the techniques described herein may enable a first wireless device (e.g., a UE) to transmit feedback information (e.g., HARQ-ACK feedback) on PSFCH resources that span multiple OFDM symbol periods, which may increase the likelihood of other devices successfully receiving the feedback information (e.g., by providing greater temporal diversity). Moreover, the first wireless device may transmit other information (e.g., CSI) on the PSFCH resources, which may enable the first wireless device to attain higher throughput levels.

The resource mapping 500 may also support techniques for decreasing collisions between sidelink feedback transmissions (e.g., PSFCH transmissions) from different wireless devices. For example, if two wireless devices (e.g., UEs) are assigned to the same PSSCH resources, a control node (e.g., a base station or a UE) may use a SLIV or a bitmap to allocate different PSFCH resources to the wireless devices (e.g., such that PSFCH transmissions from the wireless devices are separated in time). Using a SLIV or a bitmap to separate PSFCH transmissions from the wireless devices (e.g., in the time-domain) may result in greater communication reliability and fewer signal collisions, among other benefits.

Figure 6:
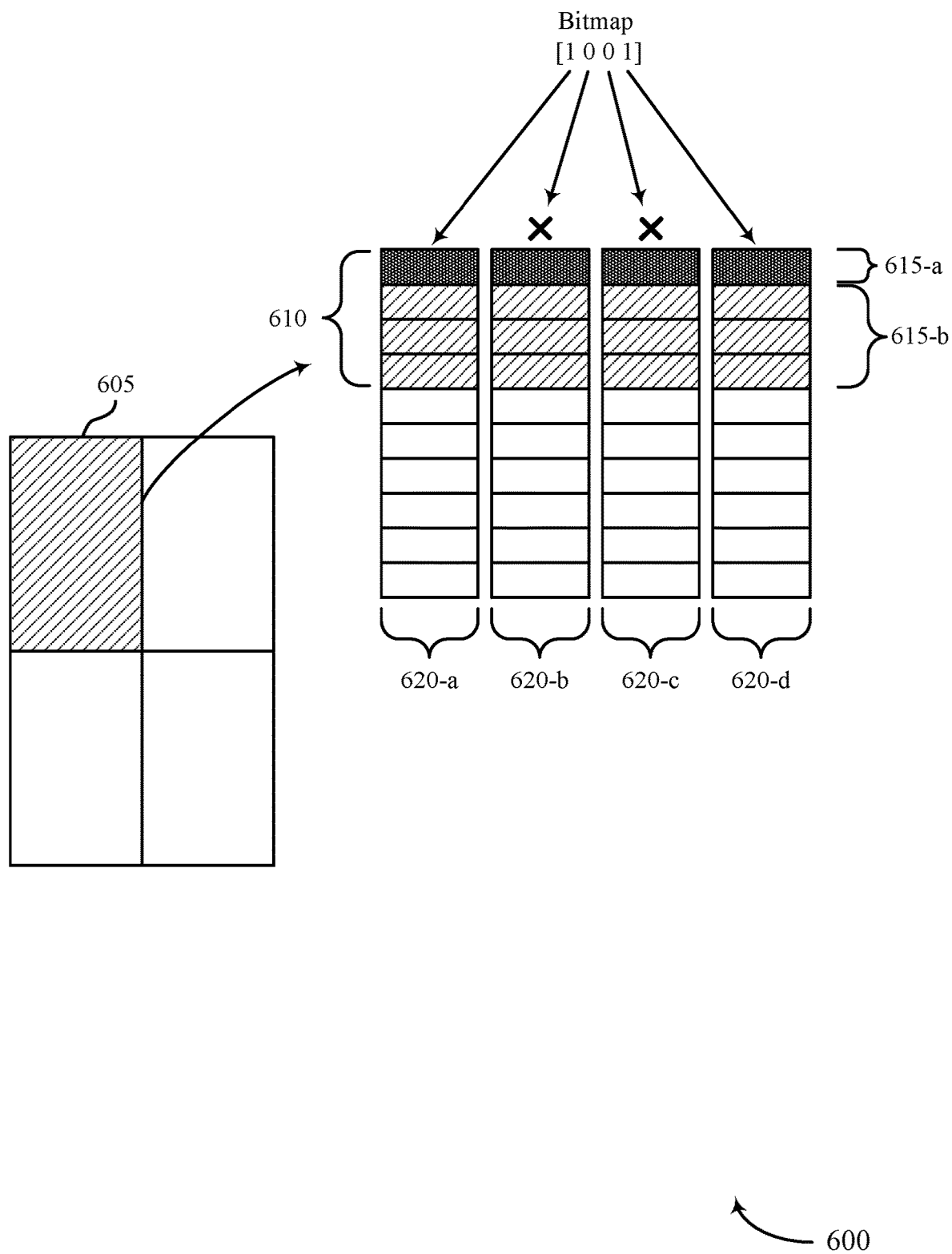

FIG. 6 illustrates an example of a resource mapping 600 that supports techniques for enhanced sidelink feedback transmission in accordance with aspects of the present disclosure. The resource mapping 600 may implement or be implemented by aspects of the wireless communications system 100 or the wireless communications system 200. For example, the resource mapping 600 may be implemented by a base station or a UE, which may be examples of corresponding devices described with reference to FIGS. 1 and 2. The resource mapping 600 may support techniques for enhanced sidelink feedback transmission by enabling a UE to transmit PSFCH feedback over multiple (e.g., two or more) symbol periods.

Aspects of the present disclosure may provide for using a bitmap (e.g., a time-domain bitmap) to indicate PSFCH resources. Using a bitmap may provide enhancements to MU-MIMO communication schemes, among other benefits. As described herein, allocating more OFDM symbol periods for PSFCH transmissions may enable a controller (e.g., a base station in sidelink mode 1 or a primary UE) to assign the same PSSCH resources to two UEs (e.g., in accordance with a MU-MIMO communication scheme) and separate PSFCH transmissions from the two UEs in the time-domain using a bitmap.

In some examples, a base station may configure each UE with a specific bitmap or a subset of PSFCH OFDM symbol periods per resource pool. One criterion that may be used to separate PSFCH transmissions from the two UEs in the time-domain is based on the assumption that if a first UE (e.g., UE x) and a second UE (e.g., UE y) satisfy the expression mod(source identifier (UE x)+destination identifier (UE x), Z)=mod(source identifier (UE y)+destination identifier (UE y), Z), then both the first UE and the second UE may use the same PRB for PSFCH transmission (e.g., provided that both UEs are assigned to the same time and frequency resources for PSSCH transmissions). In such cases, PSFCH transmissions from the first and second UEs may be separated in the time-domain using a bitmap (e.g., by being explicitly assigned different OFDM symbol periods for PSFCH transmission). If the first UE is unaware of the second UE or vice versa, a base station or a MU-MIMO receiver may transmit an explicit indication of the bitmap to the first UE and the second UE.

For SCI-2, a PSSCH transmitting UE may signal a time-domain bitmap to a PSSCH receiving UE. The time-domain bitmap may indicate whether the PSCCH receiving UE is to utilize a PSFCH symbol period or not. In some examples, there may be multiple bitmaps defined per resource pools. In such cases, each PSSCH transmitting UE may select one bitmap based on a PSFCH payload size (e.g., for HARQ-ACK and CSI) or a desired reliability (e.g., for QoS verification) or a bitmap point. These time-domain bitmaps may be orthogonal or non-orthogonal.

Alternatively, the bitmap indicating which OFDM symbol periods and PSFCH resources are to be used by a PSSCH receiving UE (e.g., PSFCH transmitting UE) may be derived by the PSSCH receiving UE based on a source identifier (e.g., an identifier of the PSSCH transmitting UE, a destination identifier (e.g., an identifier of the PSSCH receiving UE, a summation of the source identifier and the destination identifier, or a configured function of the source identifier and the destination identifier. In some examples, these parameters indicate an index of a bitmap defined or configured via RRC signaling or a MAC-CE (e.g., configured by a base station, a PLC, a relay UE, or a primary UE), and may be a function of payload as well (e.g., a bitmap with two is corresponding to two OFDM symbol periods may be used for a PSSCH payload size of two bits).

In such examples, the PSFCH transmitting UE may use the expression mod(source identifier+destination identifier, R) to determine which PRB to use (e.g., per PSFCH resource). If this criterion is used, the PSFCH transmitting UE may use the same PRB across all OFDM symbol periods configured for PSFCH transmission. Using this bitmap, the PSFCH transmitting UE may determine locations of PRBs to use for PSFCH transmission. For example, the PSFCH transmitting UE may determine to use one or more PRBs for a PSSCH transmission associated with a slot i and sub-channel j.

In the example of FIG. 6, a first wireless device may receive a sidelink message on PSSCH resources 605. Accordingly, the first wireless device may transmit feedback information for the sidelink message on PSFCH resources 610. Specifically, the first wireless device may transmit the feedback information on one or more PRBs 615 over one or more symbol periods 620. In some examples, the first wireless device may receive a control message that includes a time-domain bitmap associated with the PSFCH resources. The time-domain bitmap may include a quantity of bits corresponding to the symbol periods 620. For example, the time-domain bitmap may include a first value (e.g., 1) corresponding to a symbol period 620-a, a second value (e.g., 0) corresponding to a symbol period 620-b, a third value (e.g., 0) corresponding to a third symbol period 620-c, and a fourth value (e.g., 1) corresponding to a symbol period 620-d. A bit value of 1 may indicate that a symbol period is available for the first wireless device, whereas a bit value of 0 may indicate that a symbol period is not available for the first wireless device. As such, the first wireless device may be able to transmit the feedback information in the symbol period 620-a and the symbol period 620-d.

In some examples, the first wireless device may determine which PRBs to use for transmitting the feedback information based on a source identifier (e.g., an identifier of the wireless device from which the first wireless device received the sidelink message), a destination identifier (e.g., an identifier of the first wireless device), a summation of the source identifier and the destination identifier, or a combination thereof. In other examples, the first wireless device may transmit the feedback information in the same PRB across all of the symbol periods 620 available for PSFCH transmissions. For example, the first wireless device may transmit the feedback information in a PRB 615-a, and may refrain from transmitting the feedback information in PRBs 615-b (e.g., even if the PRBs 615-b are available to the first wireless device).

The resource mapping 600 may support techniques for improved communication reliability and fewer signal collisions, among other benefits. For example, the techniques described herein may enable a first wireless device (e.g., a UE) to transmit feedback information (e.g., HARQ-ACK feedback) on PSFCH resources that span multiple OFDM symbol periods, which may increase the likelihood of other devices successfully receiving the feedback information (e.g., by providing greater temporal diversity). Moreover, the first wireless device may transmit other information (e.g., CSI) on the PSFCH resources, which may enable the first wireless device to attain higher throughput levels.

The resource mapping 600 may also support techniques for decreasing collisions between sidelink feedback transmissions (e.g., PSFCH transmissions) from different wireless devices. For example, if two wireless devices (e.g., UEs) are assigned to the same PSSCH resources, a control node (e.g., a base station or a UE) may use a SLIV or a bitmap to allocate different PSFCH resources to the wireless devices (e.g., such that PSFCH transmissions from the wireless devices are separated in time). Using a SLIV or a bitmap to separate PSFCH transmissions from the wireless devices (e.g., in the time-domain) may result in greater communication reliability and fewer signal collisions, among other benefits.

Figures 7A, 7B, 7C:
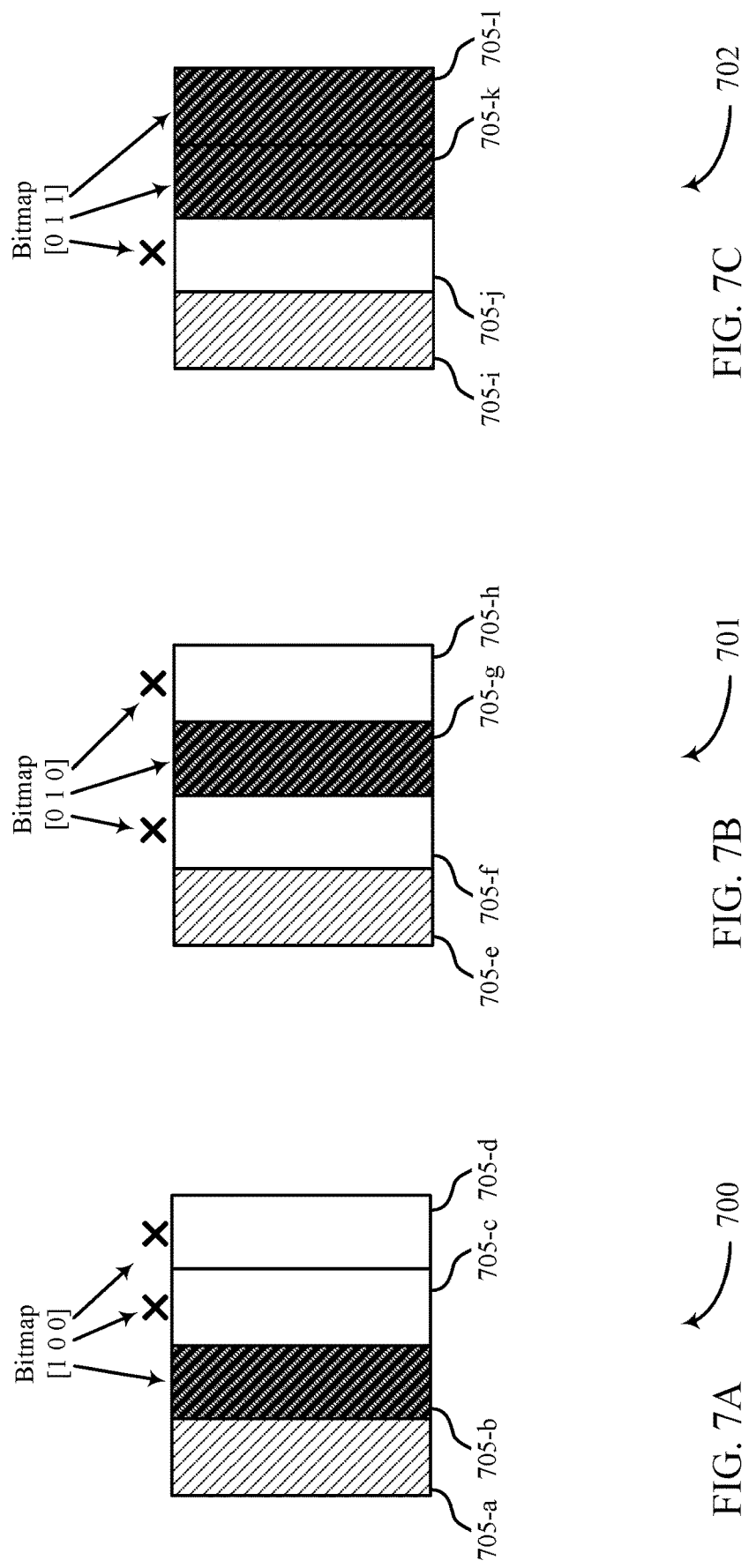
FIGS. 7A, 7B, and 7C illustrate examples of resource mappings that support techniques for enhanced sidelink feedback transmission in accordance with aspects of the present disclosure.

FIGS. 7A, 7B, and 7C illustrate examples of a resource mapping 700, a resource mapping 701, and a resource mapping 702 that support techniques for enhanced sidelink feedback transmission in accordance with aspects of the present disclosure. The resource mapping 700, the resource mapping 701, and the resource mapping 702 may implement or be implemented by aspects of the wireless communications system 100 or the wireless communications system 200. For example, the resource mapping 700, the resource mapping 701, and the resource mapping 702 may be implemented by a base station or a UE, which may be examples of corresponding devices described with reference to FIGS. 1 and 2. The resource mapping 700, the resource mapping 701, and the resource mapping 702 may illustrate different AGC symbol period configurations that may be configured by a time-domain bitmap.

As described herein, a PSSCH transmitting device may use a time-domain bitmap to indicate PSFCH resources. In such examples, a PLC may assign a bitmap of [0 1 0] such that a PSFCH transmitting UE uses the second symbol period (e.g., when the bitmap includes three bits and a common AGC symbol period) for PSFCH transmission. The resource mapping 700 illustrates an example of a common AGC symbol period. In such examples, a bitmap may indicate which OFDM symbol periods are to be used by a PSFCH transmitting UE after the AGC symbol period, which may have a fixed location in the time-domain. In some examples, this common AGC symbol period may be determined per resource pool.

For non-common AGC symbol period configurations, a bitmap may have a size of X+1, where X+1 is equal to a quantity of symbol periods configured for PSFCH. In such examples, the first 1 in the bitmap may indicate the location of the non-common AGC symbol period. Thus, the bitmap may include at least two 1s. For example, a bitmap of [0 0 1 1] may indicate that, within a set of four symbol periods, a PSFCH transmitting UE may use the third symbol period and the fourth symbol period for PSFCH transmission, where the third symbol period is the AGC symbol period. In such examples, the third symbol period may include a repetition of the fourth symbol period. If for example, a SLIV is used to indicate PSFCH resources and a non-common AGC symbol period is used, the starting symbol period indicated by the SLIV may be set as the AGC symbol period, and may include a repetition of sidelink feedback information from a subsequent symbol period.

In the example of FIG. 7A, a first wireless device may receive an indication of a bitmap, which may include a quantity of bits corresponding to symbol periods 705. For example, the bitmap may include a first bit value (e.g., 1) corresponding to a symbol period 705-b, a second bit value (e.g., 0) corresponding to a symbol period 705-c, and a third bit value (e.g., 0) corresponding to a symbol period 705-d. As described herein, a bit value of 1 may indicate that a symbol period is available for PSFCH transmissions, whereas a bit value of 0 may indicate that a symbol period is not available for PSFCH transmission. As such, the first wireless device may be able to transmit PSFCH feedback (e.g., sidelink feedback information) in the symbol period 705-*b*, and may be unable to perform PSFCH transmissions in the symbol period 705-*c* or the symbol period 705-*d*. The symbol period 705-*a* may be configured as a common AGC symbol period prior to the symbol period 705-*b*. The first wireless device may transmit a repetition of the symbol period 705-*b* (e.g., feedback information to be transmitted in the symbol period 705-*b*) during the symbol period 705-*a* to assist with AGC training.

In the example of FIG. 7B, a first wireless device may receive an indication of a bitmap, which may include a quantity of bits corresponding to symbol periods 705. For example, the bitmap may include a first bit value (e.g., 0) corresponding to a symbol period 705-*f*, a second bit value (e.g., 1) corresponding to a symbol period 705-*g*, and a third bit value (e.g., 0) corresponding to a symbol period 705-*h*. As described herein, a bit value of 1 may indicate that a symbol period is available for PSFCH transmissions, whereas a bit value of 0 may indicate that a symbol period is not available for PSFCH transmissions. As such, the first wireless device may be able to transmit PSFCH feedback (e.g., sidelink feedback information) in the symbol period 705-*g*, and may be unable to transmit feedback information in the symbol period 705-*f* or the symbol period 705-*h*. The symbol period 705-*e* may be configured as a common AGC symbol period prior to the symbol period 705-*f*. The first wireless device may transmit a repetition of the symbol period 705-*g* (e.g., feedback information to be transmitted in the symbol period 705-*g*) during the symbol period 705-*e* to assist with AGC training.

In the example of FIG. 7C, a first wireless device may receive an indication of a bitmap, which may include a quantity of bits corresponding to symbol periods 705. For example, the bitmap may include a first bit value (e.g., 0) corresponding to a symbol period 705-*j*, a second bit value (e.g., 1) corresponding to a symbol period 705-*k*, and a third bit value (e.g., 1) corresponding to a symbol period 705-1. As described herein, a bit value of 1 may indicate that a symbol period is available for PSFCH transmissions, whereas a bit value of 0 may indicate that a symbol period is not available for PSFCH transmissions. As such, the first wireless device may be able to transmit PSFCH feedback (e.g., sidelink feedback information) in the symbol period 705-*k* and the symbol period 705-1. The symbol period 705-*i* may be configured as a common AGC symbol period prior to the symbol period 705-*j*. The first wireless device may transmit a repetition of the symbol period 705-*k* (e.g., feedback information to be transmitted in the symbol period 705-*k*) during the symbol period 705-*i* to assist with AGC training.

The resource mapping 700, the resource mapping 701, and the resource mapping 702 may support techniques for improved communication reliability and fewer signal collisions, among other benefits. For example, the techniques described herein may enable a first wireless device (e.g., a UE) to transmit feedback information (e.g., HARQ-ACK feedback) on PSFCH resources that span multiple OFDM symbol periods, which may increase the likelihood of other devices successfully receiving the feedback information (e.g., by providing greater temporal diversity). Moreover, the first wireless device may transmit other information (e.g., CSI) on the PSFCH resources, which may enable the first wireless device to attain higher throughput levels.

The resource mapping 700, the resource mapping 701, and the resource mapping 702 may also support techniques for decreasing collisions between sidelink feedback transmissions (e.g., PSFCH transmissions) from different wireless devices. For example, if two wireless devices (e.g., UEs) are assigned to the same PSSCH resources, a control node (e.g., a base station or a UE) may use a SLIV or a bitmap to allocate different PSFCH resources to the wireless devices (e.g., such that PSFCH transmissions from the wireless devices are separated in time). Using a SLIV or a bitmap to separate PSFCH transmissions from the wireless devices (e.g., in the time-domain) may result in greater communication reliability and fewer signal collisions, among other benefits.

Figure 8:
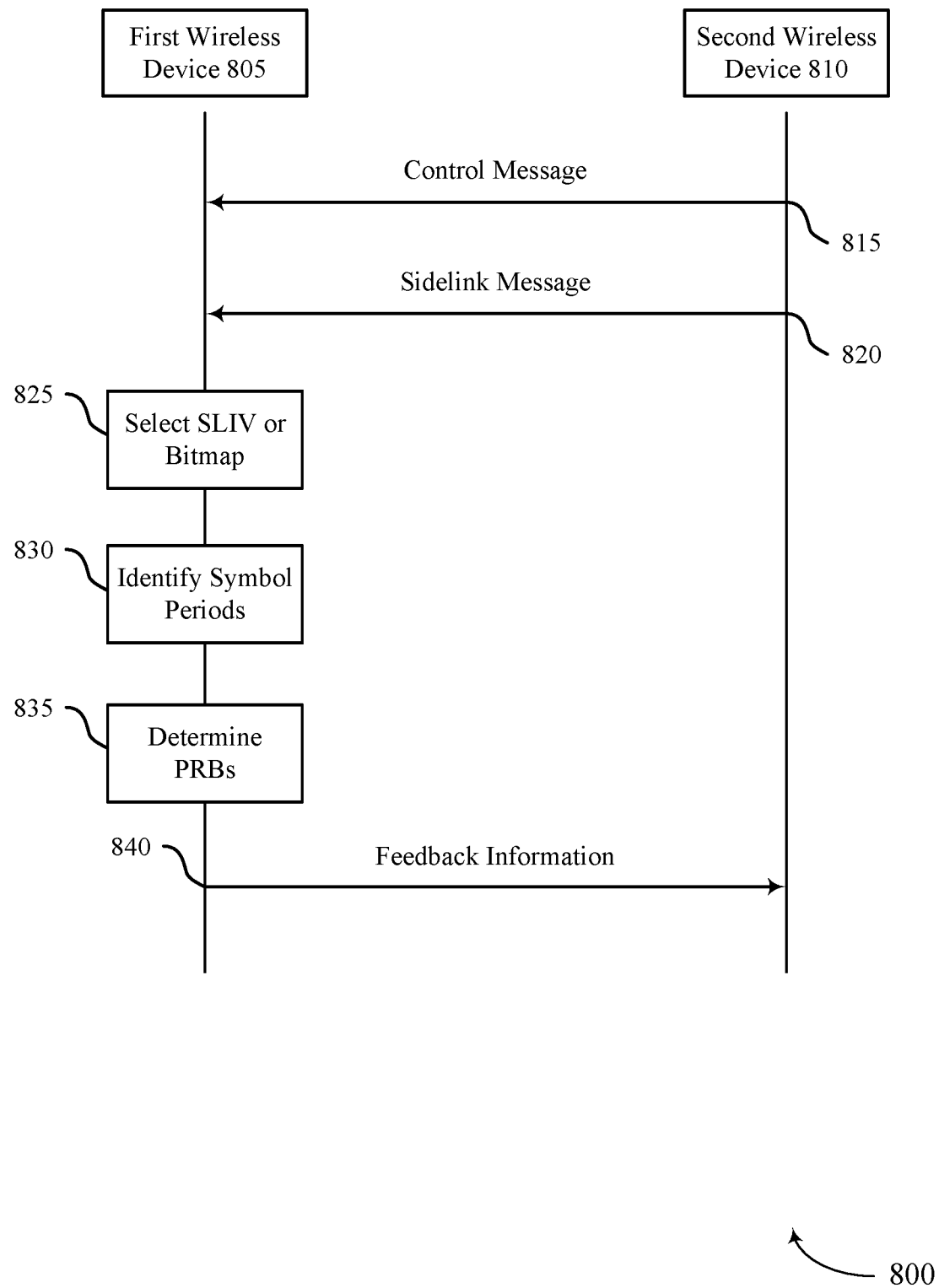
FIG. 8 illustrates an example of a process flow in a system that supports techniques for enhanced sidelink feedback transmission in accordance with aspects of the present disclosure.

FIG. 8 illustrates an example of a process flow 800 in a system that supports techniques for enhanced sidelink feedback transmission in accordance with aspects of the present disclosure. The process flow 800 may implement or be implemented by aspects of the wireless communications system 100 or the wireless communications system 200. For example, the process flow 800 may include a first wireless device 805 and a second wireless device 810, which may be examples of corresponding devices described with reference to FIGS. 1 and 2. In the following description of the process flow 800, operations between the first wireless device 805 and the second wireless device 810 may be performed in a different order or at a different time than as shown. Additionally or alternatively, some operations may be omitted from the process flow 800, and other operations may be added to the process flow 800.

At 815, the second wireless device 810 may transmit one or more control messages to the first wireless device 805. The one or more control messages may include an RRC message, a MAC-CE, DCI, SCI, or a combination thereof. The one or more control messages may indicate a feedback resource configuration for the first wireless device 805 to transmit feedback information over a sidelink feedback channel. The feedback resource configuration may include one or more SLIVs, one or more bitmaps, or a combination thereof.

At 820, the second wireless device 810 may transmit a sidelink message to the first wireless device 805. In some examples, the second wireless device 810 may transmit the sidelink message on PSSCH resources from a sidelink resource pool. At 825, the first wireless device 805 may select a SLIV from multiple SLIVs or a bitmap from multiple bitmaps based on receiving the one or more control messages from the second wireless device 810. The first wireless device 805 may select the SLIV or the bitmap based on a first identifier of the first wireless device 805, a second identifier of the second wireless device 810, or both.

In some examples, the selected SLIV may correspond to the sidelink resource pool in which the second wireless device 810 transmitted the sidelink message. The selected SLIV may indicate a starting symbol period and two or more symbol periods of the feedback channel to be used for transmitting the feedback information. Similarly, the selected bitmap may indicate a subset of symbol periods from the two or more symbol periods of the feedback channel to be used for transmitting the feedback information.

At 830, the first wireless device 805 may identify a quantity of symbol periods to use for transmitting the feedback information. In some examples, the first wireless device 805 may identify a starting symbol period and a quantity of symbol periods to use for transmission of the feedback information based on the selected SLIV. Additionally or alternatively, the first wireless device 805 may determine which symbol periods to use for transmission of the feedback information based on the selected bitmap. At

835, the first wireless device 805 may determine one or more PRBs to use for transmitting the feedback information.

In some examples, the first wireless device 805 may determine which PRBs to use for transmitting the feedback information based on the first identifier of the first wireless device 805, the second identifier of the second wireless device 810, a slot associated with the sidelink message (e.g., a slot in which the second wireless device 810 transmitted the sidelink message), a sub-channel associated with the sidelink message (e.g., a sub-channel on which the second wireless device 810 transmitted the sidelink message), or any combination thereof.

At 840, the first wireless device 805 may transmit feedback information to the second wireless device 810. The first wireless device 805 may transmit the feedback information based on decoding the sidelink message from the second wireless device 810. In some examples, the first wireless device may transmit the feedback information in the same PRB across multiple symbol periods in accordance with the feedback resource configuration. Additionally or alternatively, the first wireless device 805 may transmit a repetition of the feedback information (e.g., a portion of the feedback information) during a first symbol period such that the second wireless device 810 may use the repetition to perform AGC.

The process flow 800 may support techniques for improved communication reliability and fewer signal collisions, among other benefits. For example, the techniques described herein may enable the first wireless device 805 to transmit feedback information (e.g., HARQ-ACK feedback) on PSFCH resources that span multiple OFDM symbol periods, which may increase the likelihood of the second wireless device 810 successfully receiving the feedback information (e.g., by providing greater temporal diversity). Moreover, the first wireless device 805 may transmit other information (e.g., CSI) on the PSFCH resources, which may enable the first wireless device 805 to attain higher throughput levels.

The process flow 800 may also support techniques for decreasing collisions between sidelink feedback transmissions (e.g., PSFCH transmissions) from different wireless devices. For example, if two wireless devices are assigned to the same PSSCH resources, a control node (e.g., the second wireless device 810) may use a SLIV or a bitmap to allocate different PSFCH resources to the wireless devices (e.g., such that PSFCH transmissions from the wireless devices are separated in time). Using a SLIV or a bitmap to separate PSFCH transmissions from the wireless devices (e.g., in the time-domain) may result in greater communication reliability and fewer signal collisions, among other benefits.

Figure 9:
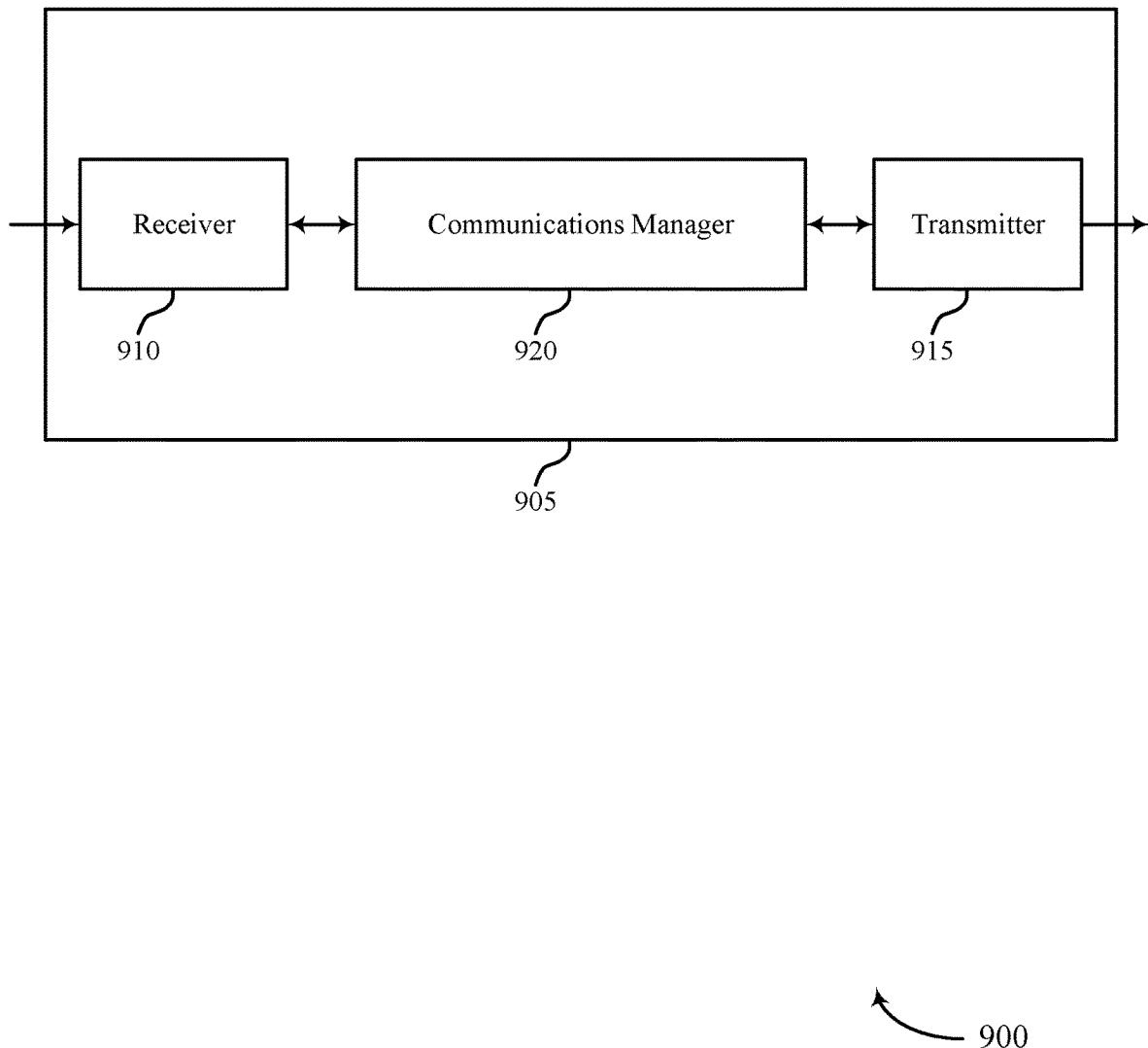
FIGS. 9 and 10 show block diagrams of devices that support techniques for enhanced sidelink feedback transmission in accordance with aspects of the present disclosure.

FIG. 9 shows a block diagram 900 of a device 905 that supports techniques for enhanced sidelink feedback transmission in accordance with aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for enhanced sidelink feedback transmission). Information may be passed on to other components of the device 905. The receiver 910 may utilize a single antenna or multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for enhanced sidelink feedback transmission). In some examples, the transmitter 915 may be co-located with a receiver 910 in a transceiver module. The transmitter 915 may utilize a single antenna or multiple antennas.

The communications manager 920, the receiver 910, the transmitter 915, or various combinations thereof or various components thereof may be examples of means for performing various aspects of techniques for enhanced sidelink feedback transmission as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, at least one processor and memory coupled (e.g., operatively, communicatively, functionally, electronically, or electrically) with the at least one processor may be configured to perform one or more of the functions described herein (e.g., by executing, by the at least one processor, instructions stored in the memory).

Additionally or alternatively, in some examples, the communications manager 920, the receiver 910, the transmitter 915, or various combinations or components thereof may be implemented in software executed by a processor. If implemented in code executed by a processor, the functions of the communications manager 920, the receiver 910, the transmitter 915, or various combinations or components thereof may be performed by a general-purpose processor, a DSP, a central processing unit (CPU), a graphics processing unit (GPU), an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a first wireless device in accordance with examples as disclosed herein. For example, the communications manager 920 may be configured as or otherwise support a means for receiving a first control message indicating a feedback resource configuration for transmitting feedback information over a sidelink feedback channel, the feedback resource configuration including one or more SLIVs, or one or more bitmaps, or any combination thereof, where the sidelink feedback channel includes two or more symbol periods. The communications manager 920 may be configured as or otherwise support a means for receiving a sidelink message from a second wireless device over a sidelink shared channel. The communications manager 920 may be configured as or otherwise support a means for transmitting the feedback information to the second wireless device based on decoding the sidelink message, where the feedback information is transmitted over the sidelink feedback channel using the two or more symbol periods in accordance with the feedback resource configuration.

Additionally or alternatively, the communications manager 920 may support wireless communications at a first wireless device in accordance with examples as disclosed herein. For example, the communications manager 920 may be configured as or otherwise support a means for identifying a feedback resource configuration for receiving feedback information over a sidelink feedback channel, the feedback resource configuration including one or more SLIVs, or one or more bitmaps, or any combination thereof, where the sidelink feedback channel includes two or more symbol periods. The communications manager 920 may be configured as or otherwise support a means for transmitting a sidelink message to a second wireless device over a sidelink shared channel. The communications manager 920 may be configured as or otherwise support a means for receiving the feedback information from the second wireless device in response to the sidelink message, where the feedback information is received over the sidelink feedback channel using the two or more symbol periods in accordance with the feedback resource configuration.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for more efficient utilization of communication resources by configuring the device 905 to transmit sidelink feedback information on PSFCH resources indicated by a SLIV or a bitmap. Using a SLIV or a bitmap to indicate PSFCH resources may enable a wireless device (e.g., a base station) to separate PSFCH transmissions from the device 905 and PSFCH transmissions from other wireless devices (e.g., in the time-domain), which may increase the likelihood of the wireless device successfully receiving PSFCH transmissions from the device 905.

Figure 10:
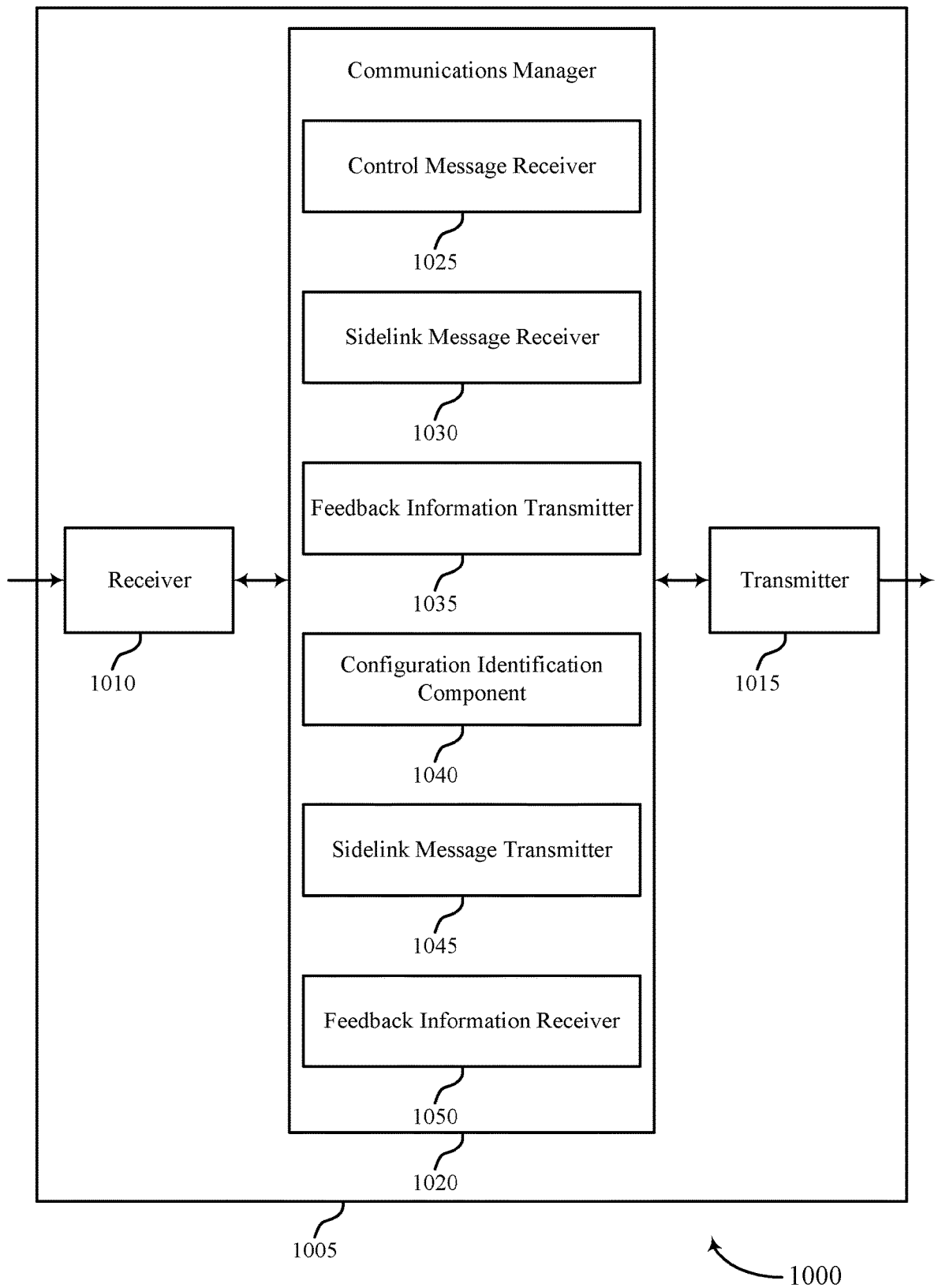

FIG. 10 shows a block diagram 1000 of a device 1005 that supports techniques for enhanced sidelink feedback transmission in accordance with aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for enhanced sidelink feedback transmission). Information may be passed on to other components of the device 1005. The receiver 1010 may utilize a single antenna or multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for enhanced sidelink feedback transmission). In some examples, the transmitter 1015 may be co-located with a receiver 1010 in a transceiver module. The transmitter 1015 may utilize a single antenna or multiple antennas.

The device 1005, or various components thereof, may be an example of means for performing various aspects of techniques for enhanced sidelink feedback transmission as described herein. For example, the communications manager 1020 may include a control message receiver 1025, a sidelink message receiver 1030, a feedback information transmitter 1035, a configuration identification component 1040, a sidelink message transmitter 1045, a feedback information receiver 1050, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a first wireless device in accordance with examples as disclosed herein. The control message receiver 1025 may be configured as or otherwise support a means for receiving a first control message indicating a feedback resource configuration for transmitting feedback information over a sidelink feedback channel, the feedback resource configuration including one or more SLIVs, or one or more bitmaps, or any combination thereof, where the sidelink feedback channel includes two or more symbol periods. The sidelink message receiver 1030 may be configured as or otherwise support a means for receiving a sidelink message from a second wireless device over a sidelink shared channel. The feedback information transmitter 1035 may be configured as or otherwise support a means for transmitting the feedback information to the second wireless device based on decoding the sidelink message, where the feedback information is transmitted over the sidelink feedback channel using the two or more symbol periods in accordance with the feedback resource configuration.

Additionally or alternatively, the communications manager 1020 may support wireless communications at a first wireless device in accordance with examples as disclosed herein. The configuration identification component 1040 may be configured as or otherwise support a means for identifying a feedback resource configuration for receiving feedback information over a sidelink feedback channel, the feedback resource configuration including one or more SLIVs, or one or more bitmaps, or any combination thereof, where the sidelink feedback channel includes two or more symbol periods. The sidelink message transmitter 1045 may be configured as or otherwise support a means for transmitting a sidelink message to a second wireless device over a sidelink shared channel. The feedback information receiver 1050 may be configured as or otherwise support a means for receiving the feedback information from the second wireless device in response to the sidelink message, where the feedback information is received over the sidelink feedback channel using the two or more symbol periods in accordance with the feedback resource configuration.

Figure 11:
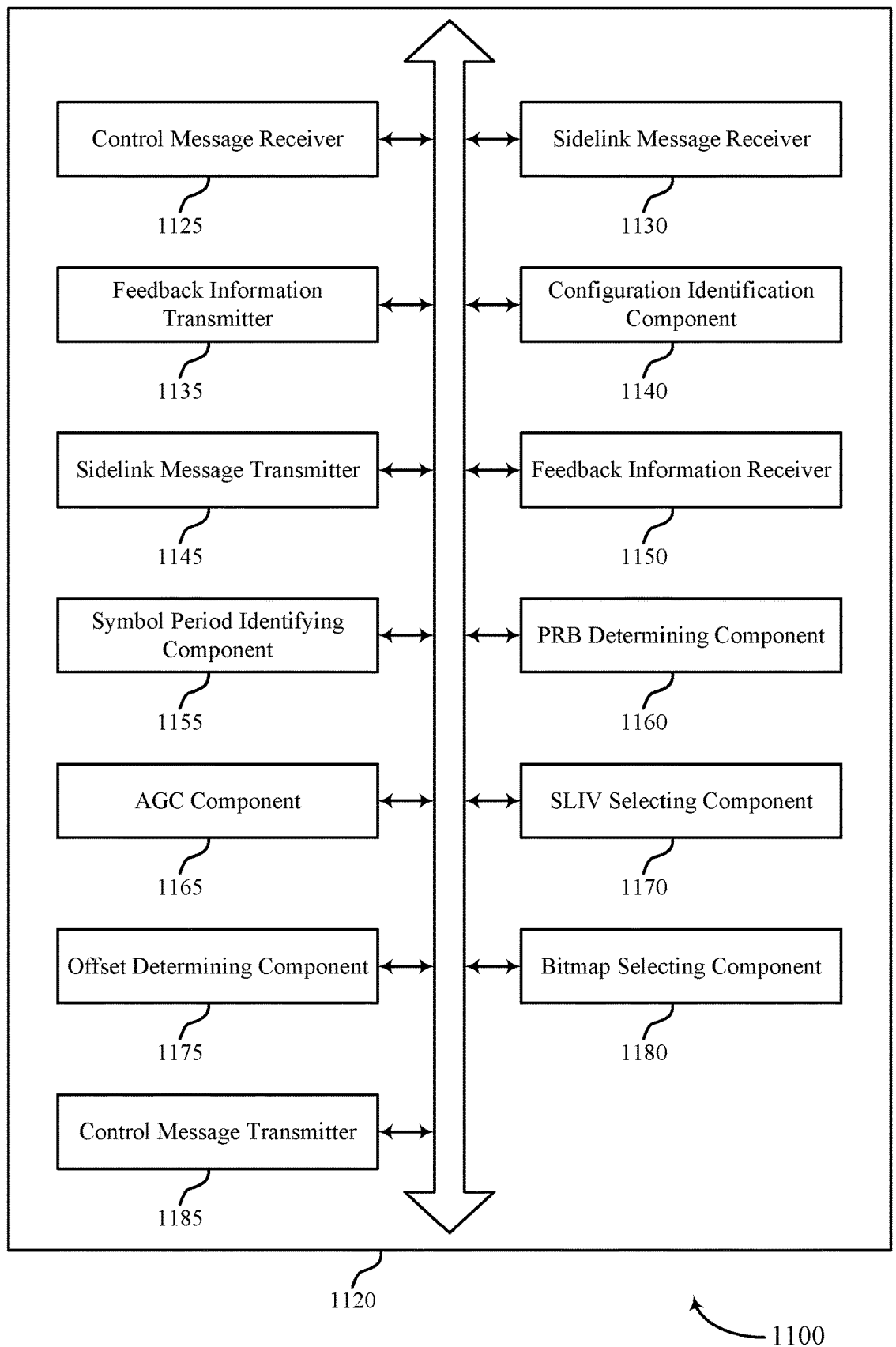
FIG. 11 shows a block diagram of a communications manager that supports techniques for enhanced sidelink feedback transmission in accordance with aspects of the present disclosure.

FIG. 11 shows a block diagram 1100 of a communications manager 1120 that supports techniques for enhanced sidelink feedback transmission in accordance with aspects of the present disclosure. The communications manager 1120 may be an example of aspects of a communications manager 920, a communications manager 1020, or both, as described herein. The communications manager 1120, or various components thereof, may be an example of means for performing various aspects of techniques for enhanced sidelink feedback transmission as described herein. For example, the communications manager 1120 may include a control message receiver 1125, a sidelink message receiver 1130, a feedback information transmitter 1135, a configuration identification component 1140, a sidelink message transmitter 1145, a feedback information receiver 1150, a symbol period identifying component 1155, an PRB determining component 1160, an AGC component 1165, an SLIV selecting component 1170, an offset determining component 1175, a bitmap selecting component 1180, a control message transmitter 1185, or any combination thereof. Each of these components may communicate, directly or indirectly, with one another (e.g., via one or more buses).

The communications manager 1120 may support wireless communications at a first wireless device in accordance with examples as disclosed herein. The control message receiver 1125 may be configured as or otherwise support a means for receiving a first control message indicating a feedback resource configuration for transmitting feedback information over a sidelink feedback channel, the feedback resource configuration including one or more SLIVs, or one or more bitmaps, or any combination thereof, where the sidelink feedback channel includes two or more symbol periods. The sidelink message receiver 1130 may be configured as or otherwise support a means for receiving a sidelink message from a second wireless device over a sidelink shared channel. The feedback information transmitter 1135 may be configured as or otherwise support a means for transmitting the feedback information to the second wireless device based on decoding the sidelink message, where the feedback information is transmitted over the sidelink feedback channel using the two or more symbol periods in accordance with the feedback resource configuration.

In some examples, the feedback resource configuration includes the one or more SLIVs, and the symbol period identifying component 1155 may be configured as or otherwise support a means for identifying a starting symbol period and a quantity of the two or more symbol periods for transmitting the feedback information based on a SLIV from the one or more SLIVs, where the feedback information is transmitted to the second wireless device using resources corresponding to the starting symbol period and the quantity of the two or more symbol periods. In some examples, the quantity of the two or more symbol periods for the feedback information is based on a payload size of the sidelink message. In some examples, the one or more SLIVs correspond to a sidelink resource pool, the sidelink message being received on one or more resources from the sidelink resource pool.

In some examples, the control message receiver 1125 may be configured as or otherwise support a means for receiving, from the second wireless device, a second control message indicating the SLIV for transmitting the feedback information associated with the sidelink message. In some examples, the SLIV selecting component 1170 may be configured as or otherwise support a means for selecting the SLIV from the one or more SLIVs based on the second control message.

In some examples, the SLIV selecting component 1170 may be configured as or otherwise support a means for selecting the SLIV from the one or more SLIVs based on a first identifier of the first wireless device, or a second identifier of the second wireless device, or both.

In some examples, the offset determining component 1175 may be configured as or otherwise support a means for determining a time-domain offset from the starting symbol period based on a first identifier of the first wireless device, a second identifier of the second wireless device, or both, where transmitting the feedback information to the second wireless device is based on the determined time-domain offset.

In some examples, the feedback resource configuration includes the one or more bitmaps, and the symbol period identifying component 1155 may be configured as or otherwise support a means for identifying a subset of symbol periods from the two or more symbol periods for transmitting the feedback information indicated by a bitmap from the one or more bitmaps, where the feedback information is transmitted to the second wireless device using the subset of symbol periods.

In some examples, the control message receiver 1125 may be configured as or otherwise support a means for receiving, from the second wireless device, a second control message indicating the bitmap for transmitting the feedback information associated with the sidelink message. In some examples, the bitmap selecting component 1180 may be configured as or otherwise support a means for selecting the bitmap from the one or more bitmaps based on the second control message.

In some examples, the bitmap selecting component 1180 may be configured as or otherwise support a means for selecting the bitmap from the one or more bitmaps based on a first identifier of the first wireless device, or a second identifier of the second wireless device, or both.

In some examples, a quantity of symbol periods of the two or more symbol periods indicated by the bitmap and used for the feedback information is based on a payload size of the feedback information, content of the feedback information, a reliability metric associated with the feedback information, a metric associated with the bitmap, or any combination thereof. In some examples, the one or more bitmaps correspond to a sidelink resource pool, the sidelink message being received on one or more resources from the sidelink resource pool.

In some examples, to support transmitting the feedback information, the feedback information transmitter 1135 may be configured as or otherwise support a means for transmitting the feedback information in a same PRB of each symbol period of the two or more symbol periods and in accordance with the bitmap.

In some examples, to support transmitting the feedback information, the feedback information transmitter 1135 may be configured as or otherwise support a means for transmitting a repetition of at least a portion of the feedback information during a first symbol period of the two or more symbol periods, the first symbol period preceding a remaining number of symbol periods of the two or more symbol periods that include the feedback information, where the repetition during the first symbol period is associated with AGC procedures.

In some examples, the bitmap selecting component 1180 may be configured as or otherwise support a means for identifying a second bitmap that indicates a location of the first symbol period within the two or more symbol periods of the sidelink feedback channel. In some examples, the two or more symbol periods are contiguous in a time-domain. In some examples, the first control message includes an RRC message, a MAC-CE, DCI, SCI, or any combination thereof.

In some examples, the PRB determining component 1160 may be configured as or otherwise support a means for determining one or more PRBs to use for transmitting the feedback information during the two or more symbol periods based on a first identifier of the first wireless device, a second identifier of the second wireless device, a slot associated with the received sidelink message, a sub-channel associated with the received sidelink message, or any combination thereof, where the feedback information is transmitted on the one or more PRBs based on the determination.

Additionally or alternatively, the communications manager 1120 may support wireless communications at a first wireless device in accordance with examples as disclosed herein. The configuration identification component 1140 may be configured as or otherwise support a means for identifying a feedback resource configuration for receiving feedback information over a sidelink feedback channel, the feedback resource configuration including one or more SLIVs, or one or more bitmaps, or any combination thereof, where the sidelink feedback channel includes two or more symbol periods. The sidelink message transmitter 1145 may be configured as or otherwise support a means for transmitting a sidelink message to a second wireless device over a sidelink shared channel. The feedback information receiver 1150 may be configured as or otherwise support a means for receiving the feedback information from the second wireless device in response to the sidelink message, where the feedback information is received over the sidelink feedback channel using the two or more symbol periods in accordance with the feedback resource configuration.

In some examples, the feedback resource configuration includes the one or more SLIVs, and the symbol period identifying component 1155 may be configured as or otherwise support a means for identifying a starting symbol period and a quantity of the two or more symbol periods for receiving the feedback information based on a SLIV from the one or more SLIVs, where the feedback information is received from the second wireless device using resources corresponding to the starting symbol period and the quantity of the two or more symbol periods. In some examples, the quantity of the two or more symbol periods for the feedback information is based on a payload size of the sidelink message. In some examples, the one or more SLIVs correspond to a sidelink resource pool, the sidelink message being received on one or more resources from the sidelink resource pool.

In some examples, the SLIV selecting component 1170 may be configured as or otherwise support a means for selecting the SLIV from the one or more SLIVs. In some examples, the control message transmitter 1185 may be configured as or otherwise support a means for transmitting, to the second wireless device, a control message indicating the selected SLIV for the feedback information associated with the sidelink message.

In some examples, to support receiving the feedback information, the feedback information receiver 1150 may be configured as or otherwise support a means for receiving the feedback information from the second wireless device based on a time-domain offset from the starting symbol period, the time-domain offset being based on a first identifier of the first wireless device, a second identifier of the second wireless device, or both.

In some examples, the feedback resource configuration includes the one or more bitmaps, and the symbol period identifying component 1155 may be configured as or otherwise support a means for identifying a subset of symbol periods from the two or more symbol periods for receiving the feedback information indicated by a bitmap from the one or more bitmaps, where the feedback information is received from the second wireless device using the subset of symbol periods. In some examples, the one or more bitmaps correspond to a sidelink resource pool, the sidelink message being received on one or more resources from the sidelink resource pool.

In some examples, the bitmap selecting component 1180 may be configured as or otherwise support a means for selecting the bitmap from the one or more bitmaps based on a payload size of the feedback information, content of the feedback information, a reliability metric associated with the feedback information, a metric associated with the bitmap, or any combination thereof. In some examples, the control message transmitter 1185 may be configured as or otherwise support a means for transmitting, to the second wireless device, a control message indicating the bitmap for the feedback information associated with the sidelink message.

In some examples, to support receiving the feedback information, the feedback information receiver 1150 may be configured as or otherwise support a means for receiving a repetition of at least a portion of the feedback information during a first symbol period of the two or more symbol periods, the first symbol period preceding a remaining number of symbol periods of the two or more symbol periods that include the feedback information, where a location of the first symbol period is indicated by a second bitmap. In some examples, to support receiving the feedback information, the AGC component 1165 may be configured as or otherwise support a means for performing AGC procedures for receiving the sidelink message based on the repetition during the first symbol period.

Figure 12:
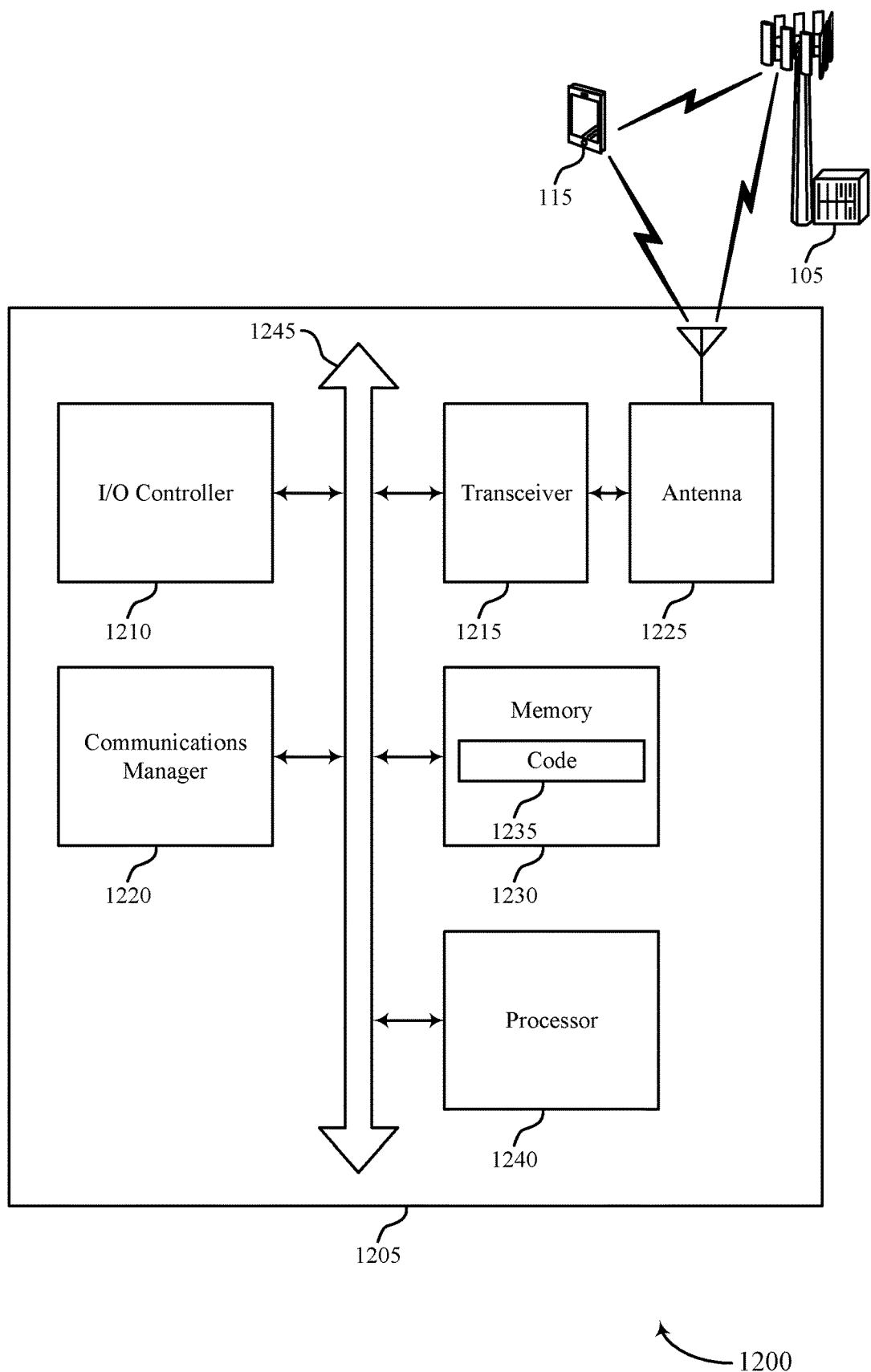
FIG. 12 shows a diagram of a system including a device that supports techniques for enhanced sidelink feedback transmission in accordance with aspects of the present disclosure.

FIG. 12 shows a diagram of a system 1200 including a device 1205 that supports techniques for enhanced sidelink feedback transmission in accordance with aspects of the present disclosure. The device 1205 may be an example of or include the components of a device 905, a device 1005, or a UE 115 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a GPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for enhanced sidelink feedback transmission). For example, the device 1205 or a component of the device 1205 may include a processor 1240 and memory 1230 coupled to the processor 1240, the processor 1240 and memory 1230 configured to perform various functions described herein.

The communications manager 1220 may support wireless communications at a first wireless device in accordance with examples as disclosed herein. For example, the communications manager 1220 may be configured as or otherwise support a means for receiving a first control message indicating a feedback resource configuration for transmitting feedback information over a sidelink feedback channel, the feedback resource configuration including one or more SLIVs, or one or more bitmaps, or any combination thereof, where the sidelink feedback channel includes two or more symbol periods. The communications manager 1220 may be configured as or otherwise support a means for receiving a sidelink message from a second wireless device over a sidelink shared channel. The communications manager 1220 may be configured as or otherwise support a means for transmitting the feedback information to the second wireless device based on decoding the sidelink message, where the feedback information is transmitted over the sidelink feedback channel using the two or more symbol periods in accordance with the feedback resource configuration.

Additionally or alternatively, the communications manager 1220 may support wireless communications at a first wireless device in accordance with examples as disclosed herein. For example, the communications manager 1220 may be configured as or otherwise support a means for identifying a feedback resource configuration for receiving feedback information over a sidelink feedback channel, the feedback resource configuration including one or more SLIVs, or one or more bitmaps, or any combination thereof, where the sidelink feedback channel includes two or more symbol periods. The communications manager 1220 may be configured as or otherwise support a means for transmitting a sidelink message to a second wireless device over a sidelink shared channel. The communications manager 1220 may be configured as or otherwise support a means for receiving the feedback information from the second wireless device in response to the sidelink message, where the feedback information is received over the sidelink feedback channel using the two or more symbol periods in accordance with the feedback resource configuration.

By including or configuring the communications manager 1220 in accordance with examples as described herein, the device 1205 may support techniques for improved communication reliability and fewer signal collisions based on transmitting sidelink feedback information on PSFCH resources indicated by a SLIV or a bitmap. Using a SLIV or a bitmap to indicate PSFCH resources may reduce the likelihood of collisions between PSFCH transmissions from the device 1205 and PSFCH transmissions from other wireless devices, even if the device 1205 and the other wireless devices are assigned to the same PSSCH resources. Specifically, the SLIV or the bitmap may assign the device 1205 and the other wireless devices to different PSFCH resources (e.g., PSFCH resources that are separated in time), which may reduce the frequency of collisions between PSFCH transmissions from the device 1205 and PSFCH transmissions from the other wireless devices.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for enhanced sidelink feedback transmission as described herein, or the processor 1240 and the memory 1230 may be otherwise configured to perform or support such operations.

Figure 13:
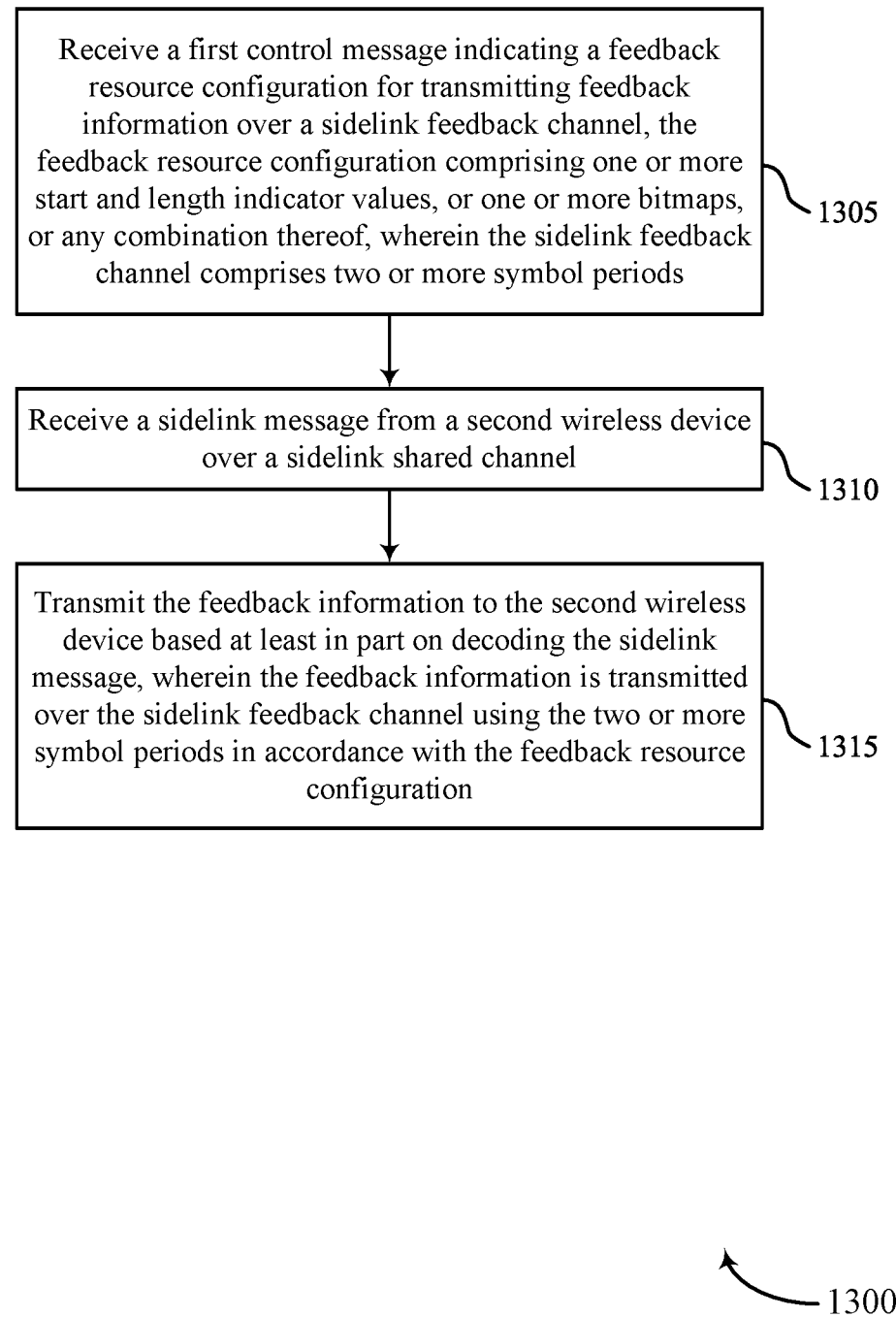
FIGS. 13 through 16 show flowcharts illustrating methods that support techniques for enhanced sidelink feedback transmission in accordance with aspects of the present disclosure.

FIG. 13 shows a flowchart illustrating a method 1300 that supports techniques for enhanced sidelink feedback transmission in accordance with aspects of the present disclosure. The operations of the method 1300 may be implemented by a UE or its components as described herein. For example, the operations of the method 1300 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1305, the method may include receiving a first control message indicating a feedback resource configuration for transmitting feedback information over a sidelink feedback channel, the feedback resource configuration comprising one or more start and length indicator values, or one or more bitmaps, or any combination thereof, wherein the sidelink feedback channel comprises two or more symbol periods. The operations of 1305 may be performed in accordance with examples as disclosed herein. In some examples, aspects of the operations of 1305 may be performed by a control message receiver 1125 as described with reference to FIG. 11.

At 1310, the method may include receiving a sidelink message from a second wireless device over a sidelink shared channel. The operations of 1310 may be performed in accordance with examples as disclosed herein. In some examples, aspects of the operations of 1310 may be performed by a sidelink message receiver 1130 as described with reference to FIG. 11.

At 1315, the method may include transmitting the feedback information to the second wireless device based at least in part on decoding the sidelink message, wherein the feedback information is transmitted over the sidelink feedback channel using the two or more symbol periods in accordance with the feedback resource configuration. The operations of 1315 may be performed in accordance with examples as disclosed herein. In some examples, aspects of the operations of 1315 may be performed by a feedback information transmitter 1135 as described with reference to FIG. 11.

Figure 14:
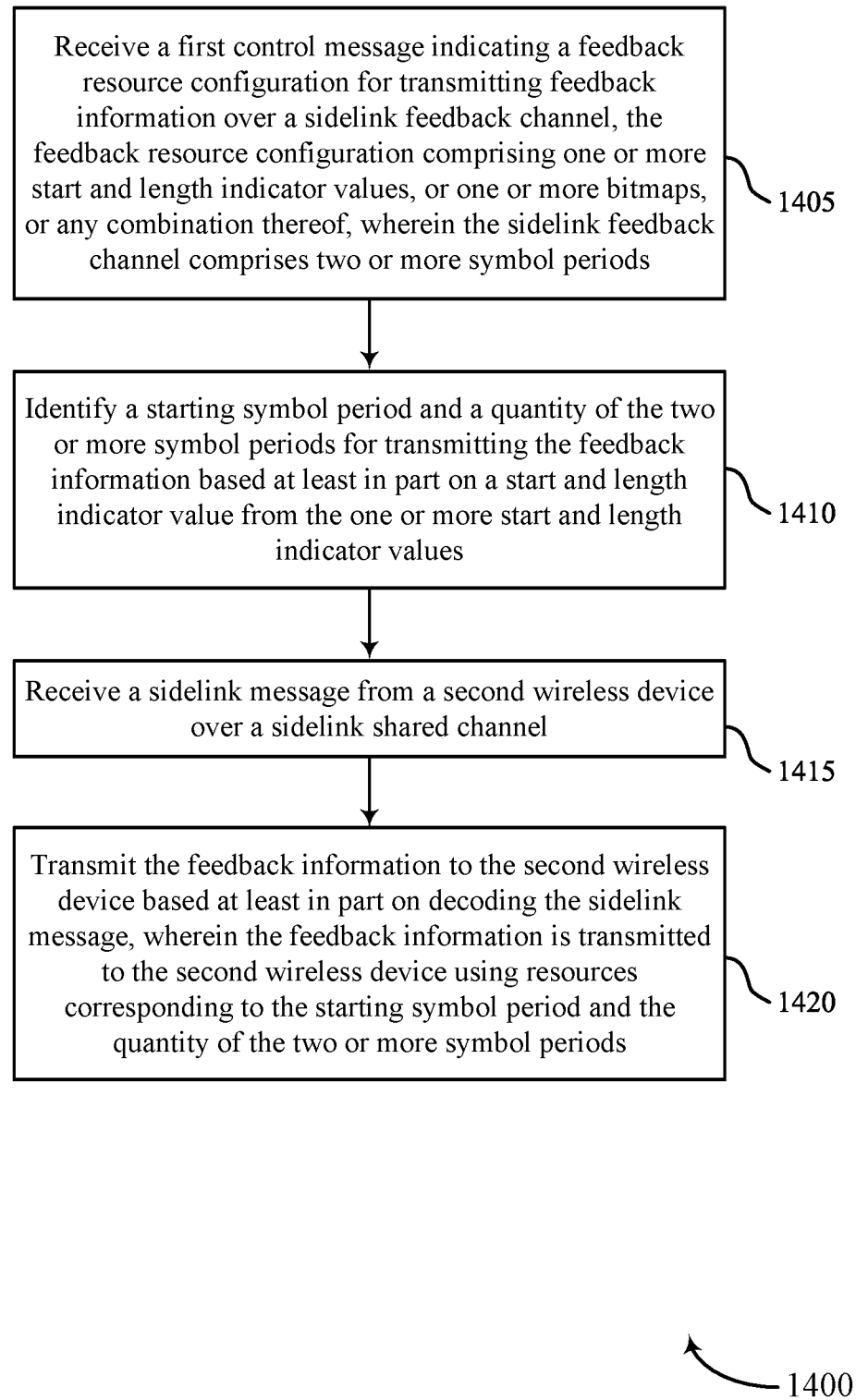

FIG. 14 shows a flowchart illustrating a method 1400 that supports techniques for enhanced sidelink feedback transmission in accordance with aspects of the present disclosure. The operations of the method 1400 may be implemented by a UE or its components as described herein. For example, the operations of the method 1400 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1405, the method may include receiving a first control message indicating a feedback resource configuration for transmitting feedback information over a sidelink feedback channel, the feedback resource configuration comprising one or more start and length indicator values, or one or more bitmaps, or any combination thereof, wherein the sidelink feedback channel comprises two or more symbol periods. The operations of 1405 may be performed in accordance with examples as disclosed herein. In some examples, aspects of the operations of 1405 may be performed by a control message receiver 1125 as described with reference to FIG. 11.

At 1410, the method may include identifying a starting symbol period and a quantity of the two or more symbol periods for transmitting the feedback information based at least in part on a start and length indicator value from the one or more start and length indicator values. The operations of 1410 may be performed in accordance with examples as disclosed herein. In some examples, aspects of the operations of 1410 may be performed by a symbol period identifying component 1155 as described with reference to FIG. 11.

At 1415, the method may include receiving a sidelink message from a second wireless device over a sidelink shared channel. The operations of 1415 may be performed in accordance with examples as disclosed herein. In some examples, aspects of the operations of 1415 may be performed by a sidelink message receiver 1130 as described with reference to FIG. 11.

At 1420, the method may include transmitting the feedback information to the second wireless device based at least in part on decoding the sidelink message, wherein the feedback information is transmitted to the second wireless device using resources corresponding to the starting symbol period and the quantity of the two or more symbol periods. The operations of 1420 may be performed in accordance with examples as disclosed herein. In some examples, aspects of the operations of 1420 may be performed by a feedback information transmitter 1135 as described with reference to FIG. 11.

Figure 15:
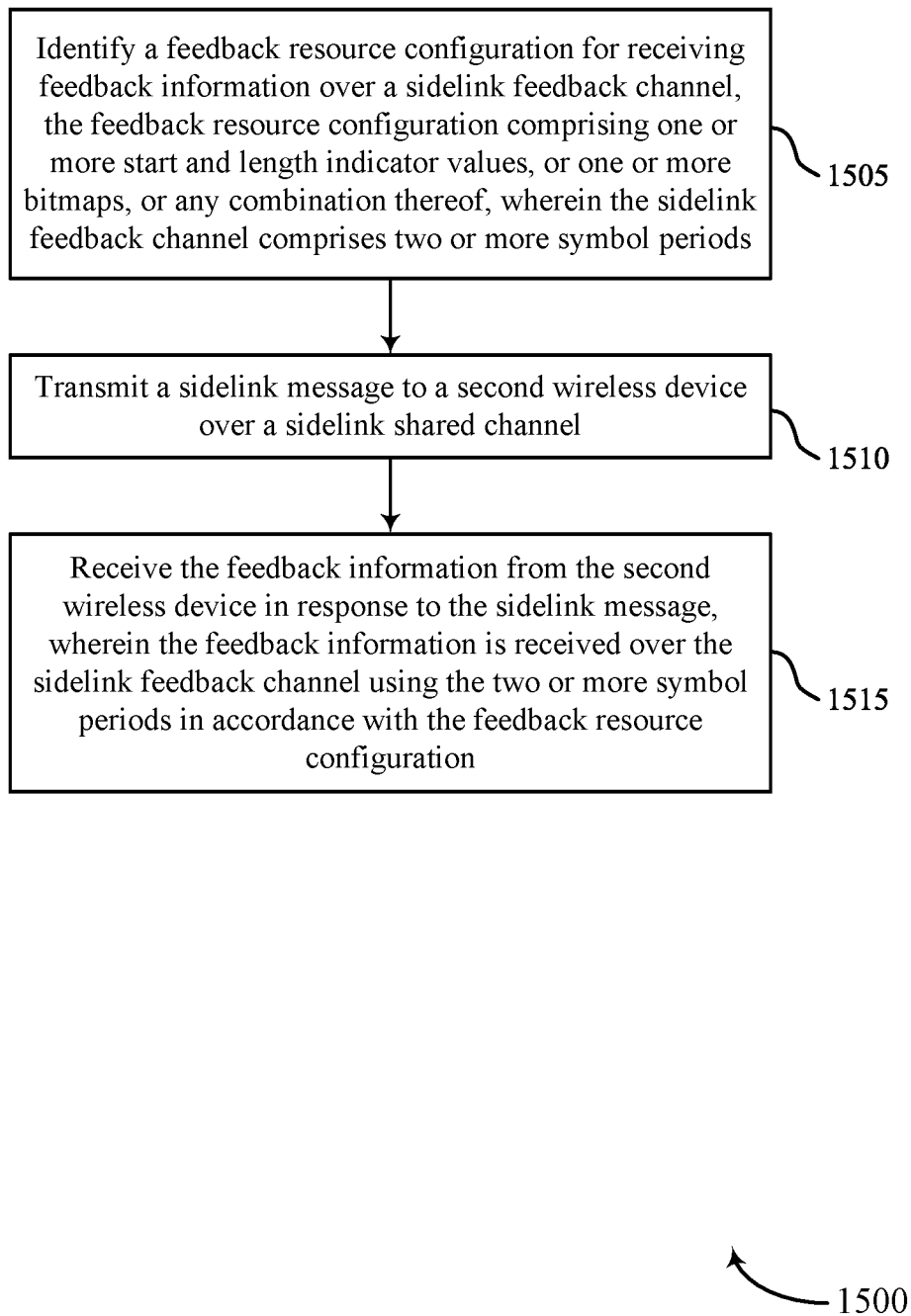

FIG. 15 shows a flowchart illustrating a method 1500 that supports techniques for enhanced sidelink feedback transmission in accordance with aspects of the present disclosure. The operations of the method 1500 may be implemented by a UE or its components as described herein. For example, the operations of the method 1500 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1505, the method may include identifying a feedback resource configuration for receiving feedback information over a sidelink feedback channel, the feedback resource configuration comprising one or more start and length indicator values, or one or more bitmaps, or any combination thereof, wherein the sidelink feedback channel comprises two or more symbol periods. The operations of 1505 may be performed in accordance with examples as disclosed herein. In some examples, aspects of the operations of 1505 may be performed by a configuration identification component 1140 as described with reference to FIG. 11.

At 1510, the method may include transmitting a sidelink message to a second wireless device over a sidelink shared channel. The operations of 1510 may be performed in accordance with examples as disclosed herein. In some examples, aspects of the operations of 1510 may be performed by a sidelink message transmitter 1145 as described with reference to FIG. 11.

At 1515, the method may include receiving the feedback information from the second wireless device in response to the sidelink message, wherein the feedback information is received over the sidelink feedback channel using the two or more symbol periods in accordance with the feedback resource configuration. The operations of 1515 may be performed in accordance with examples as disclosed herein. In some examples, aspects of the operations of 1515 may be performed by a feedback information receiver 1150 as described with reference to FIG. 11.

Figure 16:
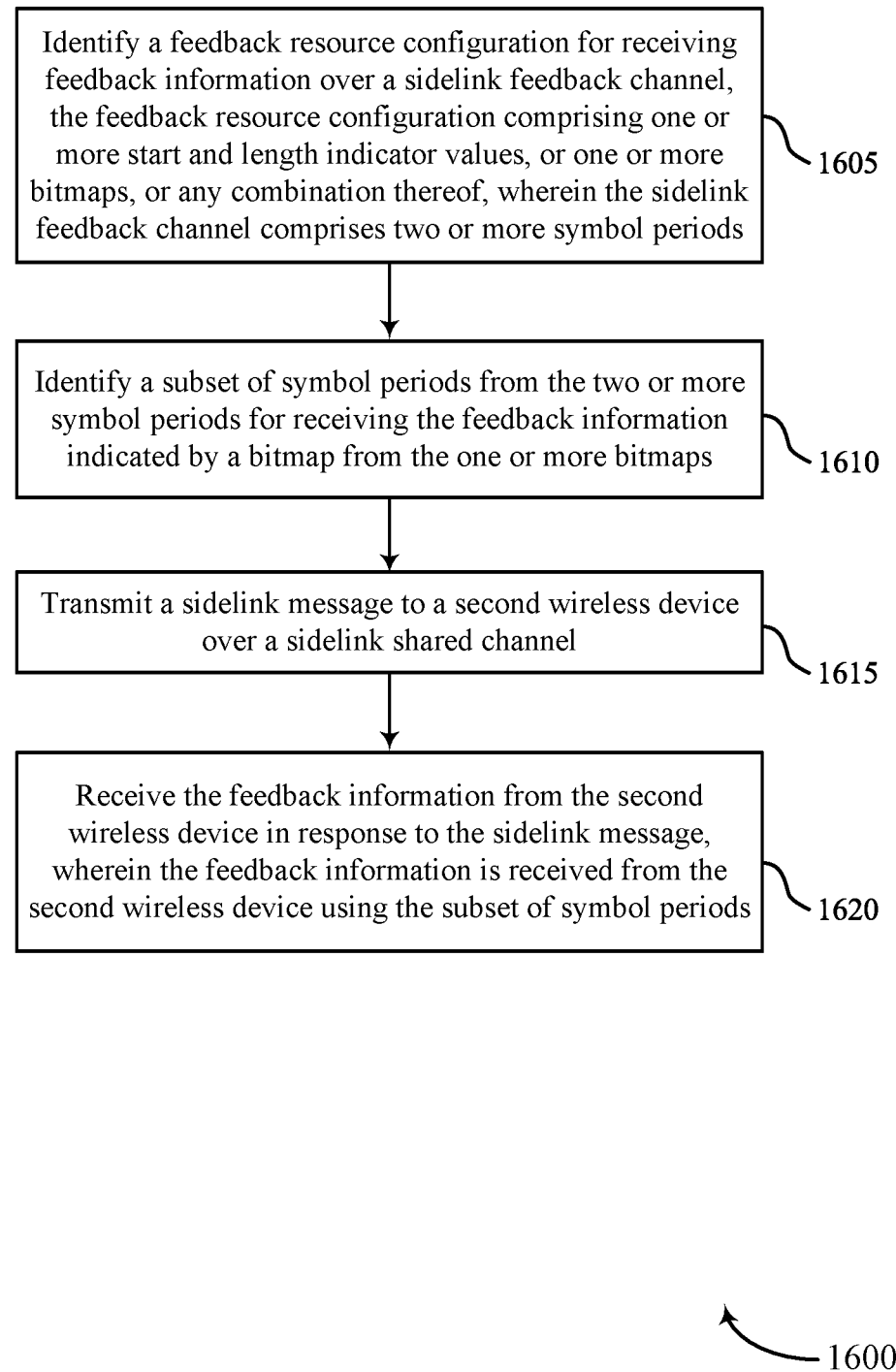

FIG. 16 shows a flowchart illustrating a method 1600 that supports techniques for enhanced sidelink feedback transmission in accordance with aspects of the present disclosure. The operations of the method 1600 may be implemented by a UE or its components as described herein. For example, the operations of the method 1600 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1605, the method may include identifying a feedback resource configuration for receiving feedback information over a sidelink feedback channel, the feedback resource configuration comprising one or more start and length indicator values, or one or more bitmaps, or any combination thereof, wherein the sidelink feedback channel comprises two or more symbol periods. The operations of 1605 may be performed in accordance with examples as disclosed herein. In some examples, aspects of the operations of 1605 may be performed by a configuration identification component 1140 as described with reference to FIG. 11.

At 1610, the method may include identifying a subset of symbol periods from the two or more symbol periods for receiving the feedback information indicated by a bitmap from the one or more bitmaps. The operations of 1610 may be performed in accordance with examples as disclosed herein. In some examples, aspects of the operations of 1610 may be performed by a symbol period identifying component 1155 as described with reference to FIG. 11.

At 1615, the method may include transmitting a sidelink message to a second wireless device over a sidelink shared channel. The operations of 1615 may be performed in accordance with examples as disclosed herein. In some examples, aspects of the operations of 1615 may be performed by a sidelink message transmitter 1145 as described with reference to FIG. 11.

At 1620, the method may include receiving the feedback information from the second wireless device in response to the sidelink message, wherein the feedback information is received from the second wireless device using the subset of symbol periods. The operations of 1620 may be performed in accordance with examples as disclosed herein. In some examples, aspects of the operations of 1620 may be performed by a feedback information receiver 1150 as described with reference to FIG. 11.

The following provides an overview of aspects of the present disclosure:

Aspect 1: A method for wireless communications at a first wireless device, comprising: receiving a first control message indicating a feedback resource configuration for transmitting feedback information over a sidelink feedback channel, the feedback resource configuration comprising one or more start and length indicator values, or one or more bitmaps, or any combination thereof, wherein the sidelink feedback channel comprises two or more symbol periods; receiving a sidelink message from a second wireless device over a sidelink shared channel; and transmitting the feedback information to the second wireless device based at least in part on decoding the sidelink message, wherein the feedback information is transmitted over the sidelink feedback channel using the two or more symbol periods in accordance with the feedback resource configuration.

Aspect 2: The method of aspect 1, wherein the feedback resource configuration comprises the one or more start and length indicator values, the method further comprising: identifying a starting symbol period and a quantity of the two or more symbol periods for transmitting the feedback information based at least in part on a start and length indicator value from the one or more start and length indicator values, wherein the feedback information is transmitted to the second wireless device using resources corresponding to the starting symbol period and the quantity of the two or more symbol periods.

Aspect 3: The method of aspect 2, further comprising: receiving, from the second wireless device, a second control message indicating the start and length indicator value for transmitting the feedback information associated with the sidelink message; and selecting the start and length indicator value from the one or more start and length indicator values based at least in part on the second control message.

Aspect 4: The method of any of aspects 2 through 3, further comprising: selecting the start and length indicator value from the one or more start and length indicator values based at least in part on a first identifier of the first wireless device, or a second identifier of the second wireless device, or both.

Aspect 5: The method of any of aspects 2 through 4, further comprising: determining a time-domain offset from the starting symbol period based at least in part on a first identifier of the first wireless device, a second identifier of the second wireless device, or both, wherein transmitting the feedback information to the second wireless device is based at least in part on the determined time-domain offset.

Aspect 6: The method of any of aspects 2 through 5, wherein the quantity of the two or more symbol periods for the feedback information is based at least in part on a payload size of the sidelink message.

Aspect 7: The method of any of aspects 2 through 6, wherein the one or more start and length indicator values correspond to a sidelink resource pool, the sidelink message being received on one or more resources from the sidelink resource pool.

Aspect 8: The method of any of aspects 1 through 7, wherein the feedback resource configuration comprises the one or more bitmaps, the method further comprising: identifying a subset of symbol periods from the two or more symbol periods for transmitting the feedback information indicated by a bitmap from the one or more bitmaps, wherein the feedback information is transmitted to the second wireless device using the subset of symbol periods.

Aspect 9: The method of aspect 8, further comprising: receiving, from the second wireless device, a second control message indicating the bitmap for transmitting the feedback information associated with the sidelink message; and selecting the bitmap from the one or more bitmaps based at least in part on the second control message.

Aspect 10: The method of any of aspects 8 through 9, further comprising: selecting the bitmap from the one or more bitmaps based at least in part on a first identifier of the first wireless device, or a second identifier of the second wireless device, or both.

Aspect 11: The method of any of aspects 8 through 10, wherein a number of symbol periods of the two or more symbol periods indicated by the bitmap and used for the feedback information is based at least in part on a payload size of the feedback information, content of the feedback information, a reliability metric associated with the feedback information, a metric associated with the bitmap, or any combination thereof.

Aspect 12: The method of any of aspects 8 through 11, wherein the one or more bitmaps correspond to a sidelink resource pool, the sidelink message being received on one or more resources from the sidelink resource pool.

Aspect 13: The method of any of aspects 8 through 12, wherein transmitting the feedback information comprises: transmitting the feedback information in a same physical resource block of each symbol period of the two or more symbol periods and in accordance with the bitmap.

Aspect 14: The method of any of aspects 1 through 13, wherein transmitting the feedback information comprises: transmitting a repetition of at least a portion of the feedback information during a first symbol period of the two or more symbol periods, the first symbol period preceding a remaining number of symbol periods of the two or more symbol periods that include the feedback information, wherein the repetition during the first symbol period is associated with automatic gain control procedures.

Aspect 15: The method of aspect 14, further comprising: identifying a second bitmap that indicates a location of the first symbol period within the two or more symbol periods of the sidelink feedback channel.

Aspect 16: The method of any of aspects 1 through 15, further comprising: determining one or more physical resource blocks to use for transmitting the feedback information during the two or more symbol periods based at least in part on a first identifier of the first wireless device, a second identifier of the second wireless device, a slot associated with the received sidelink message, a sub-channel associated with the received sidelink message, or any combination thereof, wherein the feedback information is transmitted on the one or more physical resource blocks based at least in part on the determination.

Aspect 17: The method of any of aspects 1 through 16, wherein the two or more symbol periods are contiguous in a time-domain.

Aspect 18: The method of any of aspects 1 through 17, wherein the first control message comprises a radio resource control message, a medium access control element, downlink control information, sidelink control information, or any combination thereof.

Aspect 19: A method for wireless communications at a first wireless device, comprising: identifying a feedback resource configuration for receiving feedback information over a sidelink feedback channel, the feedback resource configuration comprising one or more start and length indicator values, or one or more bitmaps, or any combination thereof, wherein the sidelink feedback channel comprises two or more symbol periods; transmitting a sidelink message to a second wireless device over a sidelink shared channel; and receiving the feedback information from the second wireless device in response to the sidelink message, wherein the feedback information is received over the sidelink feedback channel using the two or more symbol periods in accordance with the feedback resource configuration.

Aspect 20: The method of aspect 19, wherein the feedback resource configuration comprises the one or more start and length indicator values, the method further comprising: identifying a starting symbol period and a quantity of the two or more symbol periods for receiving the feedback information based at least in part on a start and length indicator value from the one or more start and length indicator values, wherein the feedback information is received from the second wireless device using resources corresponding to the starting symbol period and the quantity of the two or more symbol periods.

Aspect 21: The method of aspect 20, further comprising: selecting the start and length indicator value from the one or more start and length indicator values; and transmitting, to the second wireless device, a control message indicating the selected start and length indicator value for the feedback information associated with the sidelink message.

Aspect 22: The method of any of aspects 20 through 21, wherein receiving the feedback information comprises: receiving the feedback information from the second wireless device based at least in part on a time-domain offset from the starting symbol period, the time-domain offset being based at least in part on a first identifier of the first wireless device, a second identifier of the second wireless device, or both.

Aspect 23: The method of any of aspects 20 through 22, wherein the quantity of the two or more symbol periods for the feedback information is based at least in part on a payload size of the sidelink message.

Aspect 24: The method of any of aspects 20 through 23, wherein the one or more start and length indicator values correspond to a sidelink resource pool, the sidelink message being received on one or more resources from the sidelink resource pool.

Aspect 25: The method of any of aspects 19 through 24, wherein the feedback resource configuration comprises the one or more bitmaps, the method further comprising: identifying a subset of symbol periods from the two or more symbol periods for receiving the feedback information indicated by a bitmap from the one or more bitmaps, wherein the feedback information is received from the second wireless device using the subset of symbol periods.

Aspect 26: The method of aspect 25, further comprising: selecting the bitmap from the one or more bitmaps based at least in part on a payload size of the feedback information, content of the feedback information, a reliability metric associated with the feedback information, a metric associated with the bitmap, or any combination thereof; and transmitting, to the second wireless device, a control message indicating the bitmap for the feedback information associated with the sidelink message.

Aspect 27: The method of any of aspects 25 through 26, wherein the one or more bitmaps correspond to a sidelink resource pool, the sidelink message being received on one or more resources from the sidelink resource pool.

Aspect 28: The method of any of aspects 19 through 27, wherein receiving the feedback information comprises: receiving a repetition of at least a portion of the feedback information during a first symbol period of the two or more symbol periods, the first symbol period preceding a remaining number of symbol periods of the two or more symbol periods that include the feedback information, wherein a location of the first symbol period is indicated by a second bitmap; and performing automatic gain control procedures for receiving the sidelink message based at least in part on the repetition during the first symbol period.

Aspect 29: An apparatus for wireless communications at a first wireless device, comprising at least one processor and memory coupled with the at least one processor, the memory storing instructions executable by the at least one processor to cause the apparatus to perform a method of any of aspects 1 through 18.

Aspect 30: An apparatus for wireless communications at a first wireless device, comprising at least one means for performing a method of any of aspects 1 through 18.

Aspect 31: A non-transitory computer-readable medium storing code for wireless communications at a first wireless device, the code comprising instructions executable by at least one processor to perform a method of any of aspects 1 through 18.

Aspect 32: An apparatus for wireless communications at a first wireless device, comprising at least one processor and memory coupled with the at least one processor, the memory storing instructions executable by the at least one processor to cause the apparatus to perform a method of any of aspects 19 through 28.

Aspect 33: An apparatus for wireless communications at a first wireless device, comprising at least one means for performing a method of any of aspects 19 through 28.

Aspect 34: A non-transitory computer-readable medium storing code for wireless communications at a first wireless device, the code comprising instructions executable by at least one processor to perform a method of any of aspects 19 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies, not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, a GPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (e.g., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The term "determine" or "determining" encompasses a wide variety of actions and, therefore, "determining" can include calculating, computing, processing, deriving, investigating, looking up (such as via looking up in a table, a database or another data structure), or ascertaining. Also, "determining" can include receiving (such as receiving information), or accessing (such as accessing data in a memory). Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first wireless device, comprising:
    receiving a first control message indicating a feedback resource configuration for transmitting feedback information over a sidelink feedback channel, the feedback resource configuration comprising one or more start and length indicator values, or one or more bitmaps, or any combination thereof, wherein the sidelink feedback channel comprises two or more symbol periods;
    receiving a sidelink message from a second wireless device over a sidelink shared channel; and
    transmitting the feedback information to the second wireless device based at least in part on decoding the sidelink message, wherein the feedback information is transmitted over the sidelink feedback channel using the two or more symbol periods in accordance with the feedback resource configuration.

2. The method of claim 1, wherein the feedback resource configuration comprises the one or more start and length indicator values, the method further comprising:
    identifying a starting symbol period and a quantity of the two or more symbol periods for transmitting the feedback information based at least in part on a start and length indicator value from the one or more start and length indicator values, wherein the feedback information is transmitted to the second wireless device using resources corresponding to the starting symbol period and the quantity of the two or more symbol periods.

3. The method of claim 2, further comprising:
    receiving, from the second wireless device, a second control message indicating the start and length indicator value for transmitting the feedback information associated with the sidelink message; and
    selecting the start and length indicator value from the one or more start and length indicator values based at least in part on the second control message.

4. The method of claim 2, further comprising:
    selecting the start and length indicator value from the one or more start and length indicator values based at least in part on a first identifier of the first wireless device, or a second identifier of the second wireless device, or both.

5. The method of claim 2, further comprising:
    determining a time-domain offset from the starting symbol period based at least in part on a first identifier of the first wireless device, a second identifier of the second wireless device, or both, wherein transmitting the feedback information to the second wireless device is based at least in part on the determined time-domain offset.

6. The method of claim 2, wherein the quantity of the two or more symbol periods for the feedback information is based at least in part on a payload size of the sidelink message.

7. The method of claim 2, wherein the one or more start and length indicator values correspond to a sidelink resource pool, the sidelink message being received on one or more resources from the sidelink resource pool.

8. The method of claim 1, wherein the feedback resource configuration comprises the one or more bitmaps, the method further comprising:
    identifying a subset of symbol periods from the two or more symbol periods for transmitting the feedback information indicated by a bitmap from the one or more bitmaps, wherein the feedback information is transmitted to the second wireless device using the subset of symbol periods.

9. The method of claim 8, further comprising:
    receiving, from the second wireless device, a second control message indicating the bitmap for transmitting the feedback information associated with the sidelink message; and
    selecting the bitmap from the one or more bitmaps based at least in part on the second control message.

10. The method of claim 8, further comprising:
    selecting the bitmap from the one or more bitmaps based at least in part on a first identifier of the first wireless device, or a second identifier of the second wireless device, or both.

11. The method of claim 8, wherein a quantity of symbol periods of the two or more symbol periods indicated by the bitmap and used for the feedback information is based at least in part on a payload size of the feedback information, content of the feedback information, a reliability metric associated with the feedback information, a metric associated with the bitmap, or any combination thereof.

12. The method of claim 8, wherein the one or more bitmaps correspond to a sidelink resource pool, the sidelink message being received on one or more resources from the sidelink resource pool.

13. The method of claim 8, wherein transmitting the feedback information comprises:
    transmitting the feedback information in a same physical resource block of each symbol period of the two or more symbol periods and in accordance with the bitmap.

14. The method of claim 1, wherein transmitting the feedback information comprises:
    transmitting a repetition of at least a portion of the feedback information during a first symbol period of the two or more symbol periods, the first symbol period preceding a remaining number of symbol periods of the two or more symbol periods that include the feedback information, wherein the repetition during the first symbol period is associated with automatic gain control procedures.

15. The method of claim 14, further comprising:
identifying a second bitmap that indicates a location of the first symbol period within the two or more symbol periods of the sidelink feedback channel.

16. The method of claim 1, further comprising:
determining one or more physical resource blocks to use for transmitting the feedback information during the two or more symbol periods based at least in part on a first identifier of the first wireless device, a second identifier of the second wireless device, a slot associated with the received sidelink message, a sub-channel associated with the received sidelink message, or any combination thereof, wherein the feedback information is transmitted on the one or more physical resource blocks based at least in part on the determination.

17. The method of claim 1, wherein the two or more symbol periods are contiguous in a time-domain.

18. The method of claim 1, wherein the first control message comprises a radio resource control message, a medium access control-control element, downlink control information, sidelink control information, or any combination thereof.

19. A method for wireless communications at a first wireless device, comprising:
identifying a feedback resource configuration for receiving feedback information over a sidelink feedback channel, the feedback resource configuration comprising one or more start and length indicator values, or one or more bitmaps, or any combination thereof, wherein the sidelink feedback channel comprises two or more symbol periods;
transmitting a sidelink message to a second wireless device over a sidelink shared channel; and
receiving the feedback information from the second wireless device in response to the sidelink message, wherein the feedback information is received over the sidelink feedback channel using the two or more symbol periods in accordance with the feedback resource configuration.

20. The method of claim 19, wherein the feedback resource configuration comprises the one or more start and length indicator values, the method further comprising:
identifying a starting symbol period and a quantity of the two or more symbol periods for receiving the feedback information based at least in part on a start and length indicator value from the one or more start and length indicator values, wherein the feedback information is received from the second wireless device using resources corresponding to the starting symbol period and the quantity of the two or more symbol periods.

21. The method of claim 20, further comprising:
selecting the start and length indicator value from the one or more start and length indicator values; and
transmitting, to the second wireless device, a control message indicating the selected start and length indicator value for the feedback information associated with the sidelink message.

22. The method of claim 20, wherein receiving the feedback information comprises:
receiving the feedback information from the second wireless device based at least in part on a time-domain offset from the starting symbol period, the time-domain offset being based at least in part on a first identifier of the first wireless device, a second identifier of the second wireless device, or both.

23. The method of claim 20, wherein the quantity of the two or more symbol periods for the feedback information is based at least in part on a payload size of the sidelink message.

24. The method of claim 20, wherein the one or more start and length indicator values correspond to a sidelink resource pool, the sidelink message being received on one or more resources from the sidelink resource pool.

25. The method of claim 19, wherein the feedback resource configuration comprises the one or more bitmaps, the method further comprising:
identifying a subset of symbol periods from the two or more symbol periods for receiving the feedback information indicated by a bitmap from the one or more bitmaps, wherein the feedback information is received from the second wireless device using the subset of symbol periods.

26. The method of claim 25, further comprising:
selecting the bitmap from the one or more bitmaps based at least in part on a payload size of the feedback information, content of the feedback information, a reliability metric associated with the feedback information, a metric associated with the bitmap, or any combination thereof; and
transmitting, to the second wireless device, a control message indicating the bitmap for the feedback information associated with the sidelink message.

27. The method of claim 25, wherein the one or more bitmaps correspond to a sidelink resource pool, the sidelink message being received on one or more resources from the sidelink resource pool.

28. The method of claim 19, wherein receiving the feedback information comprises:
receiving a repetition of at least a portion of the feedback information during a first symbol period of the two or more symbol periods, the first symbol period preceding a remaining number of symbol periods of the two or more symbol periods that include the feedback information, wherein a location of the first symbol period is indicated by a second bitmap; and
performing automatic gain control procedures for receiving the sidelink message based at least in part on the repetition during the first symbol period.

29. An apparatus for wireless communications at a first wireless device, comprising:
at least one processor; and
memory coupled with the at least one processor, the memory storing instructions executable by the at least one processor to cause the apparatus to:
receive a first control message indicating a feedback resource configuration for transmitting feedback information over a sidelink feedback channel, the feedback resource configuration comprising one or more start and length indicator values, or one or more bitmaps, or any combination thereof, wherein the sidelink feedback channel comprises two or more symbol periods;
receive a sidelink message from a second wireless device over a sidelink shared channel; and
transmit the feedback information to the second wireless device based at least in part on decoding the sidelink message, wherein the feedback information is transmitted over the sidelink feedback channel using the two or more symbol periods in accordance with the feedback resource configuration.

30. An apparatus for wireless communications at a first wireless device, comprising:
- at least one processor; and
- memory coupled with the at least one processor, the memory storing instructions executable by the at least one processor to cause the apparatus to:
  - identify a feedback resource configuration for receiving feedback information over a sidelink feedback channel, the feedback resource configuration comprising one or more start and length indicator values, or one or more bitmaps, or any combination thereof, wherein the sidelink feedback channel comprises two or more symbol periods;
  - transmit a sidelink message to a second wireless device over a sidelink shared channel; and
  - receive the feedback information from the second wireless device in response to the sidelink message, wherein the feedback information is received over the sidelink feedback channel using the two or more symbol periods in accordance with the feedback resource configuration.

* * * * *